(12) United States Patent
Lukaczyk et al.

(10) Patent No.: US 11,958,641 B2
(45) Date of Patent: Apr. 16, 2024

(54) LIGHTWEIGHT STABILIZED GIMBAL CAMERA PAYLOAD FOR SMALL AERIAL VEHICLES

(71) Applicant: FLIGHTWAVE AEROSPACE SYSTEMS, Santa Monica, CA (US)

(72) Inventors: Trent Lukaczyk, Santa Monica, CA (US); Daniel Levy, Santa Monica, CA (US); Michael Colonno, Santa Monica, CA (US)

(73) Assignee: Flightwave Aerospace Systems, Santa Monica, CA (US)

( * ) Notice: Subject to any disclaimer, the term of this patent is extended or adjusted under 35 U.S.C. 154(b) by 0 days.

(21) Appl. No.: 17/738,100

(22) Filed: May 6, 2022

(65) Prior Publication Data

US 2022/0355950 A1 Nov. 10, 2022

Related U.S. Application Data

(60) Provisional application No. 63/185,381, filed on May 7, 2021.

(51) Int. Cl.
*B64U 20/87* (2023.01)
*B64U 101/30* (2023.01)
*G03B 15/00* (2021.01)
*G03B 17/55* (2021.01)
*G03B 17/56* (2021.01)

(52) U.S. Cl.
CPC .......... *B64U 20/87* (2023.01); *G03B 15/006* (2013.01); *G03B 17/55* (2013.01); *G03B 17/561* (2013.01); *B64U 2101/30* (2023.01)

(58) Field of Classification Search
CPC .... B64D 47/08; B64U 20/87; B64U 2101/30; G03B 17/55; G03B 15/006; G03B 17/561
See application file for complete search history.

(56) References Cited

U.S. PATENT DOCUMENTS

| 5,779,190 | A | * | 7/1998 | Rambo | B64C 39/024 244/54 |
| 9,518,821 | B2 | * | 12/2016 | Malay | G01C 21/20 |
| 10,784,761 | B2 | * | 9/2020 | Adams | G03B 15/006 |
| 2009/0284644 | A1 | * | 11/2009 | Mckaughan | H04N 23/90 348/E5.045 |

(Continued)

FOREIGN PATENT DOCUMENTS

CN 214618748 U * 11/2021

OTHER PUBLICATIONS

International Patent Application No. PCT/US2022/028051; Int'l Search Report and the Written Opinion; dated Sep. 19, 2022; 9 pages.

(Continued)

*Primary Examiner* — Christopher E Mahoney
(74) *Attorney, Agent, or Firm* — BakerHostetler

(57) ABSTRACT

A gimbal configured to be implemented in an unmanned aerial system. The gimbal includes a payload interface; an end effector; a structure that includes composite skins, an internal structure, and integrated seals; integrated drive components; and at least one computer, where excess heat generated by the at least one computer is disposed of through a heat transfer surface integrated into the composite skin of the gimbal.

20 Claims, 35 Drawing Sheets

(56) References Cited

U.S. PATENT DOCUMENTS

| | | | |
|---|---|---|---|
| 2013/0051778 A1* | 2/2013 | Dimotakis | G03B 17/08 |
| | | | 396/12 |
| 2019/0163037 A1* | 5/2019 | Koyama | B64D 47/08 |
| 2020/0183259 A1 | 6/2020 | Ye | |
| 2022/0355951 A1* | 11/2022 | Lukaczyk | B64C 39/024 |

OTHER PUBLICATIONS

Liu et al.; "Real-Time Visual Tracking of Moving Targets Using a Low-Cost Unmanned Aerial Vehicle with a 3-Axis Stabilized Gimbal System"; Applied Sciences; vol. 10; 2020; 27 pages.

Caratao et al.; "MicaSense Aerial Pointing and Stabilization System: Dampening In-Flight Vibrations for Improved Agricultural Imaging"; AIAA SciTech Forum; Jan. 2018; 16 pages.

\* cited by examiner

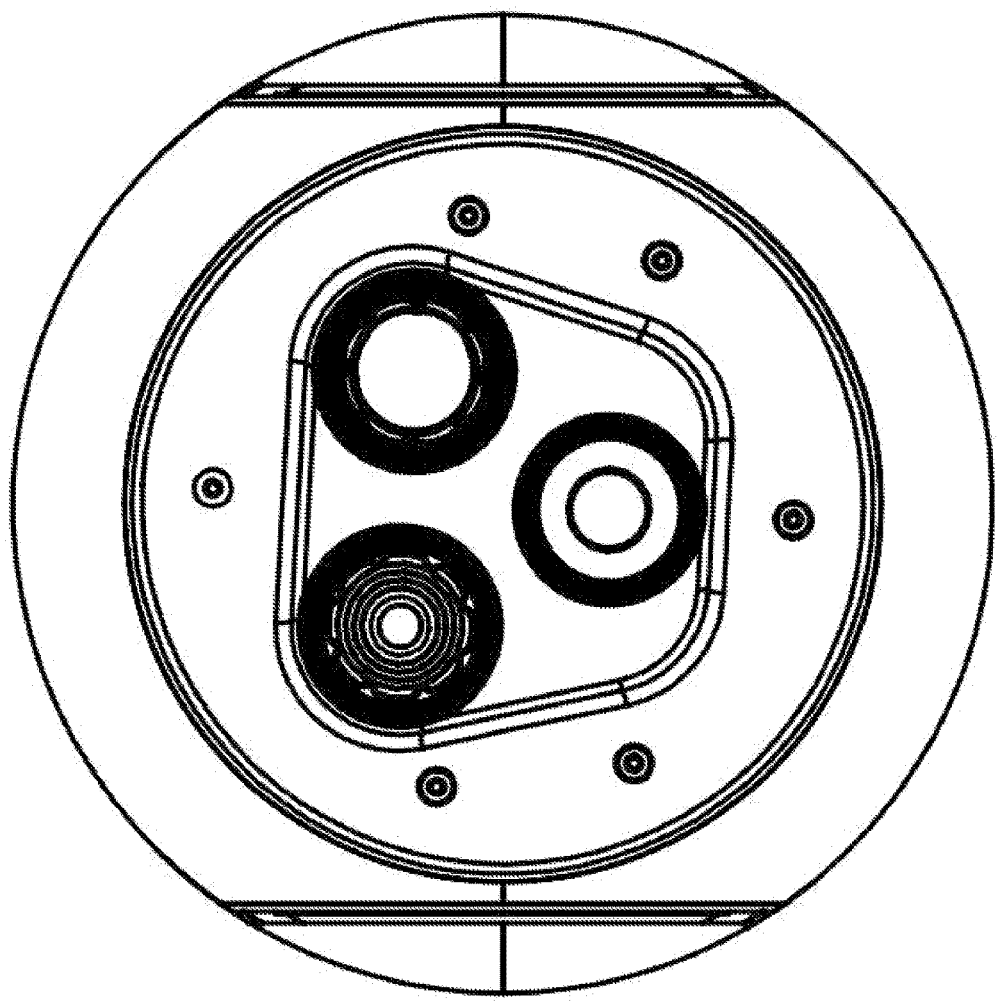
Fig. 3

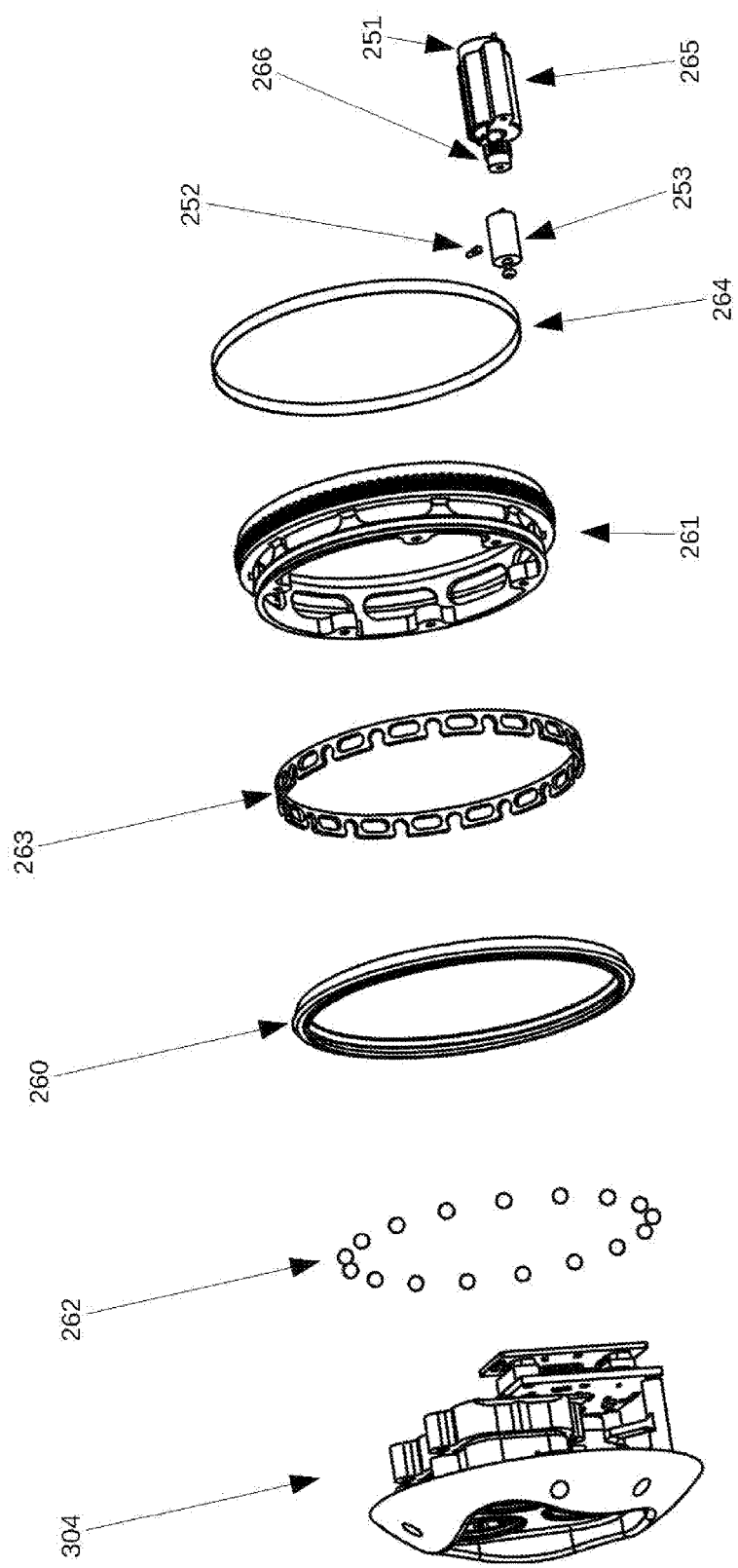

LIGHTWEIGHT STABILIZED GIMBAL CAMERA PAYLOAD FOR SMALL AERIAL VEHICLES

CROSS-REFERENCE TO RELATED APPLICATIONS

This application claims the benefit of U.S. Provisional Application No. 63/185,381 filed on May 7, 2021, which is hereby incorporated by reference in its entirety for all purposes as if fully set forth herein.

FIELD OF THE DISCLOSURE

The disclosure is directed to gimbal stabilized cameras that are mounted to unmanned aerial vehicles (UAVs) and/or gimbal stabilized cameras that are mounted to Unmanned Aircraft Systems (UAS).

BACKGROUND OF THE DISCLOSURE

Gimbals are often used to stabilize and/or move sensors attached to UAVs. This can allow for the user to see stable footage as well as point the sensor at a specified location or target. In some cases the gimbal is not light enough to be carried by the UAS, or the gimbal does not have a high enough sensor quality to be useful in certain applications. In addition, the gimbal may not have enough axes of rotation to show a consistent stable image. Assembling a gimbal requires many types of mechanism, software and sensors to work together well. Typically gimbals need to be stiff to minimize vibrations on the end effector and as a result are constructed of heavy metal parts. Additionally, standard art for actuating gimbals relies on brushless motors, which are both large and heavy, leaving little mass or volume available to carry the desired sensor. Another consideration is the durability of the gimbal. There can be seams or gaps in the system where the rotating parts meet that can allow for water or dust penetration.

Accordingly, a durable lightweight gimbal structured of composite skin capable of housing high resolution sensors with enough axes of rotation to show a continuous stable image is needed.

SUMMARY OF THE DISCLOSURE

The foregoing needs are met, to a great extent, by the disclosure, wherein in one aspect a technique and apparatus are provided for implementing a lightweight stabilized gimbal camera payload for small aerial vehicles.

One aspect includes a gimbal configured to be implemented in an unmanned aerial system, the gimbal includes: a payload interface configured for tool-free mechanical attachment to an unmanned aerial system; the payload interface further configured with electrical connections configured to receive power from the unmanned aerial system; the payload interface further configured with electrical connections configured to exchange data with the unmanned aerial system; an end effector configured to hold at least one sensor in a stabilized orientation; a structure includes composite skins, an internal structure, and integrated seals; integrated drive components with gearing and bearings arranged on outermost diameter of rotation interfaces with one, two or three rotational degrees of freedom; and at least one computer that includes at least one of the following: a dedicated vision computer, a dedicated targeting computer, and/or one or more rotational actuator control computers, where excess heat generated by the at least one computer is disposed of through a heat transfer surface integrated into the composite skin of the gimbal.

One aspect includes a process of implementing a lightweight stabilized attachment to an unmanned aerial system, the process of implementing a lightweight stabilized attachment to an unmanned aerial system includes: implementing a gimbal; configuring a payload interface of the gimbal for tool-free mechanical attachment to an unmanned aerial system; configuring the payload interface of the gimbal for electrical connections to receive power from the unmanned aerial system; configuring the payload interface of the gimbal for electrical connections to exchange data with the unmanned aerial system; configuring the gimbal with one, two or three rotational degrees of freedom; configuring an end effector of the gimbal to hold at least one sensor in a stabilized orientation; constructing the gimbal with composite skins and internal structure; constructing the gimbal with integrated seals and bearings in an outermost diameter of rotational interfaces; implementing integrated drive components with gearing arranged on outermost diameter of rotation interfaces; and implementing at least one computer that includes at least one of the following: a dedicated vision computer, a dedicated targeting computer, and/or one or more rotational actuator control computers, where excess heat generated by the at least one computer is disposed of through a heat transfer surface integrated into the composite skin of the gimbal.

One general aspect includes a method of constructing a lightweight stabilized camera gimbal for attachment to an unmanned aerial system with a payload interface that includes configuring the payload interface for: tool-free mechanical retention, electrical connections for power, and electrical connections for data; configuring the payload interface with one, two or three rotational degrees of freedom; configuring an end effector that holds at least one sensor in a stabilized orientation; constructing using composite skins and an internal structure; constructing using integrated seals and bearings in an outermost diameter of rotational interfaces; constructing using integrated drive components such as gearing to the outermost diameter of rotation interfaces; and implementing at least one computer that includes: a dedicated vision computer, a dedicated targeting computer, and one or more rotational actuator control computers, where excess heat generated by one or more of the computers are disposed of through a heat transfer surface integrated into the skin of the stabilized camera gimbal. Other embodiments of this aspect include corresponding computer systems, apparatus, and computer programs recorded on one or more computer storage devices, each configured to perform the actions of the methods.

One general aspect includes a method of controlling a stabilized camera gimbal that includes at least one computer, the method includes implementing the at least one computer with a computer vision function, implementing the at least one computer with a target pointing function, and implementing the at least one computer with one or more rotational actuator control functions, where excess heat generated by the at least one computer is disposed of through a heat transfer surface integrated into a skin of the stabilized camera gimbal. Other embodiments of this aspect include corresponding computer systems, apparatus, and computer programs recorded on one or more computer storage devices, each configured to perform the actions of the methods.

One general aspect includes a lightweight stabilized camera gimbal for attachment to an unmanned aerial system with a payload interface configured for: tool-free mechanical retention, electrical connections for power, and electrical connections for data; the payload interface configured with one, two or three rotational degrees of freedom; an end effector configured to hold at least one sensor in a stabilized orientation; composite skins and an internal structure; integrated seals and bearings in an outermost diameter of rotational interfaces; integrated drive components such as gearing to the outermost diameter of rotation interfaces; and at least one computer that implements: a computer vision function, a target pointing function, and one or more rotational actuator control functions, where excess heat generated by the at least one computer is disposed of through a heat transfer surface integrated into the skin of the stabilized camera gimbal. Other embodiments of this aspect include corresponding computer systems, apparatus, and computer programs recorded on one or more computer storage devices, each configured to perform the actions of the methods.

One general aspect includes a stabilized camera gimbal that includes at least one computer that includes a dedicated vision computer, a dedicated targeting computer, and one or more rotational actuator control computers, where excess heat generated by the one or more of the computers are disposed of through a heat transfer surface integrated into a skin of the stabilized camera gimbal. Other embodiments of this aspect include corresponding computer systems, apparatus, and computer programs recorded on one or more computer storage devices, each configured to perform the actions of the methods.

One aspect includes a method of constructing a lightweight stabilized camera gimbal for attachment to an unmanned aerial system with a payload interface that includes: configuring a payload interface for: tool-free mechanical retention, electrical connections for power, and electrical connections for data; configuring a payload interface with one, two or three rotational degrees of freedom; configuring an end effector that holds at least one sensor in a stabilized orientation; constructing using composite skins and an internal structure; constructing using integrated seals and bearings in an outermost diameter of the rotational interfaces; constructing using integrated drive components such as gearing to the outermost diameter of rotation interfaces; and implementing at least one computer that that includes: a dedicated vision computer, a dedicated targeting computer, and one or more rotational actuator control computers, where excess heat generated by one or more of the computers are disposed of through a heat transfer surface integrated into the skin of the stabilized camera gimbal.

One aspect includes a method of controlling a stabilized camera gimbal that includes at least one computer, that includes: implementing a dedicated vision computer, implementing a dedicated targeting computer, and implementing one or more rotational actuator control computers, where excess heat generated by one or more of the computers are disposed of through a heat transfer surface integrated into a skin of the stabilized camera gimbal.

One aspect includes a lightweight stabilized camera gimbal for attachment to an unmanned aerial system with a payload interface configured for: tool-free mechanical retention, electrical connections for power, and electrical connections for data; the payload interface configured with one, two or three rotational degrees of freedom; an end effector configured to hold at least one sensor in a stabilized orientation; composite skins and an internal structure; integrated seals and bearings in an outermost diameter of rotational interfaces; integrated drive components such as gearing to the outermost diameter of rotation interfaces; and at least one computer that that includes: a dedicated vision computer, a dedicated targeting computer, and one or more rotational actuator control computers, where excess heat generated by one or more of the computers are disposed of through a heat transfer surface integrated into the skin of the stabilized camera gimbal.

One aspect includes a stabilized camera gimbal that includes at least one computer, that includes: a dedicated vision computer, a dedicated targeting computer, and one or more rotational actuator control computers, where excess heat generated by one or more of the computers are disposed of through a heat transfer surface integrated into a skin of the stabilized camera gimbal.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the disclosure. It is important, therefore, that the claims be regarded as including such equivalent constructions insofar as they do not depart from the spirit and scope of the disclosure.

BRIEF DESCRIPTION OF THE DRAWINGS

FIG. 3 illustrates a gimbal stabilized camera according to FIG. 1.

FIG. 35 illustrates a gimbal stabilized camera according to FIG. 1.

DETAILED DESCRIPTION

Figure 1:
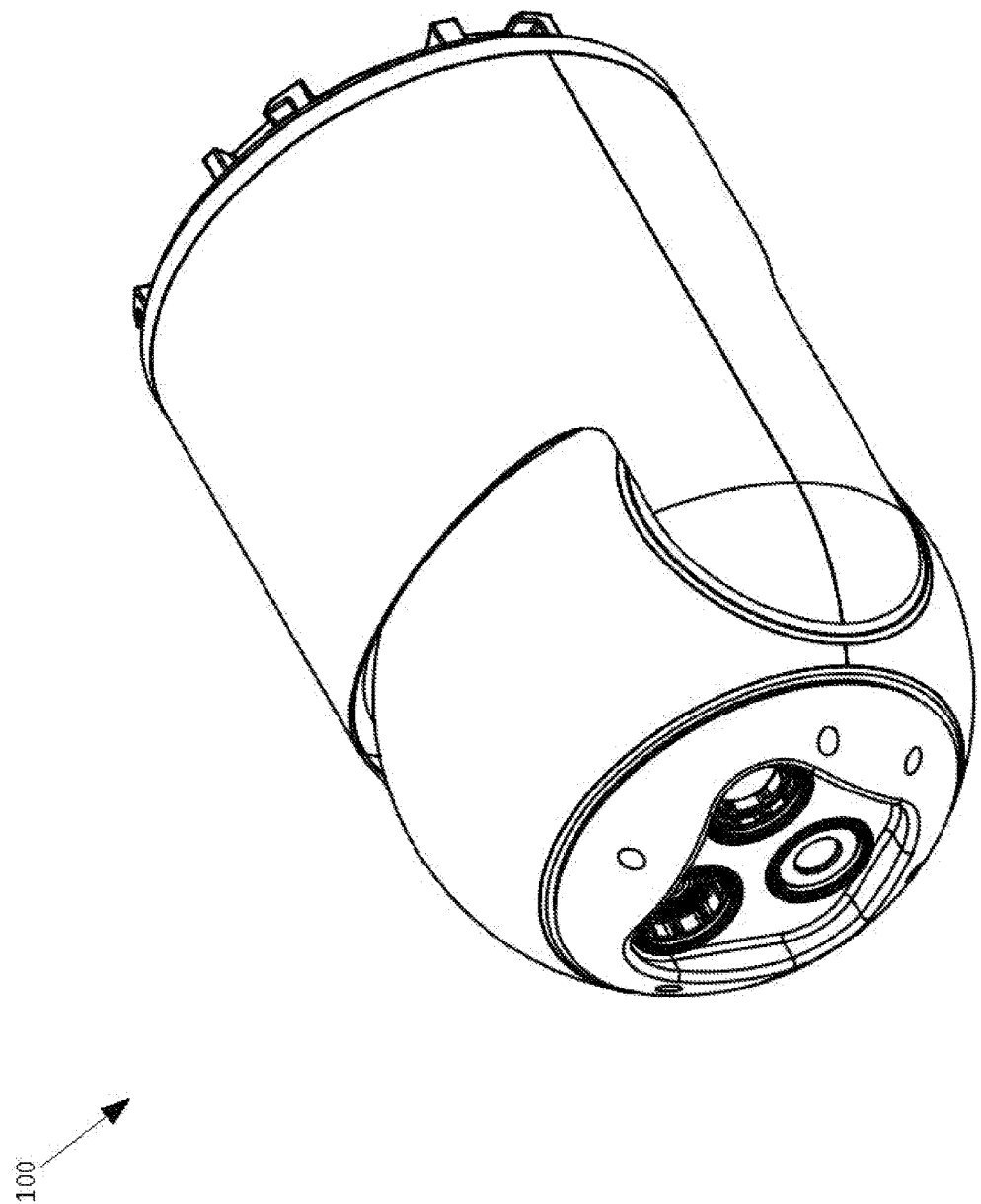
FIG. 1 illustrates a gimbal stabilized camera according to the disclosure.
Figure 2:
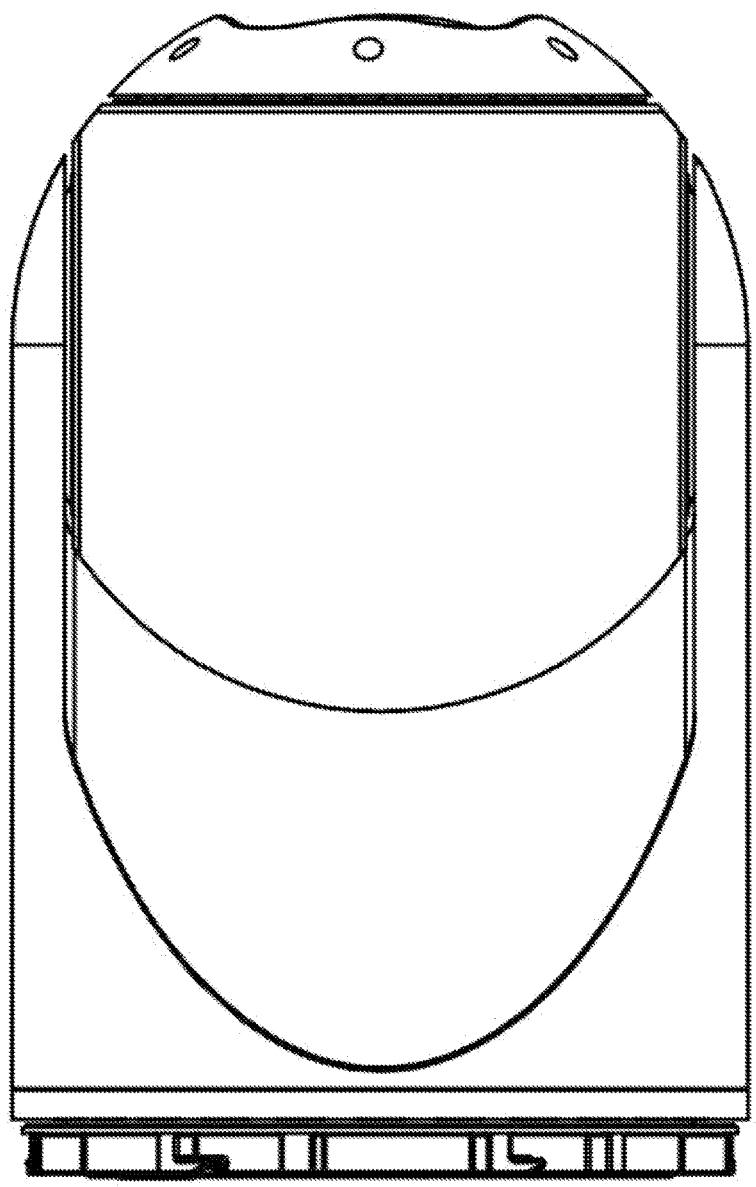
FIG. 2 illustrates a gimbal stabilized camera according to FIG. 1.
Figure 4:
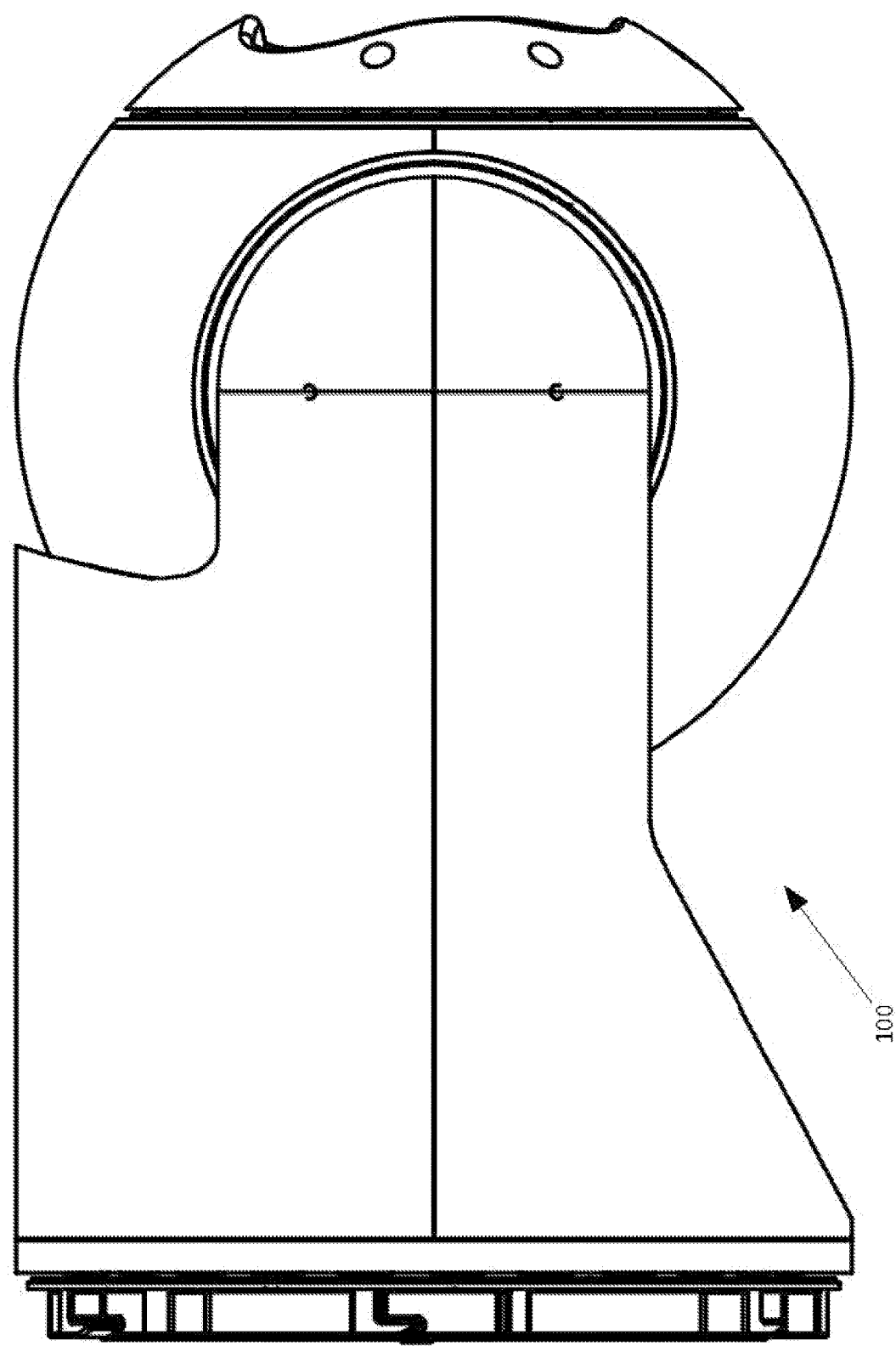
FIG. 4 illustrates a gimbal stabilized camera according to FIG. 1.

The disclosure will now be described with reference to the drawing figures, in which like reference numerals refer to like parts throughout.

System Level Description

The disclosure relates to gimbal stabilized cameras that are often mounted to an unmanned aerial vehicle (UAV). The disclosed gimbal stabilized cameras are able to reject motion disturbances as well as be controlled manually and autonomously. This provides a smooth stable video to the user either in real time if transmitted wirelessly to the ground, or at a later time when stored to an on-board storage medium.

The primary motivation of aspects of the disclosure is to provide a stabilized camera for a UAV and/or UAS that is further lightweight and environmentally hardened. The motivation for lightweight has resulted in a method for a bonded composite construction, a method for actuating rotation along an outer diameter of rotational stages, and a method for rejecting heat through the composite skin. When implemented according to the method of the disclosure and other aspects of the disclosure, the result provides a lightweight design. In particular, a large fraction (over 30%) of the payload's mass can be dedicated to sensors and computers. In aspects of the disclosure, the gimbal may be implemented as a lightweight gimbal. In aspects of the disclosure, a lightweight gimbal is defined as a gimbal having a mass less than 100 pounds, less than 50 pounds, less than 25 pounds, less than 15 pounds, less than 10 pounds, less than 5 pounds and/or less than 1 pound. Additionally, in aspects of the disclosure, a lightweight gimbal is defined as a gimbal having a mass of 0.5-1 pounds, 1-5 pounds, 5 pounds-100 pounds, 5 pounds-10 pounds, 10 pounds-15 pounds, 15 pounds-25 pounds, or 25 pounds-50 pounds. In aspects of the disclosure, the UAS may be implemented as a lightweight UAS. In aspects of the disclosure, a lightweight UAS is defined as a UAS having a mass less than 400 pounds, less than 300 pounds, less than 200 pounds, less than 100 pounds, less than 50 pounds, less than 25 pounds, less than 10 pounds, and/or less than 5 pounds. Additionally, in aspects of the disclosure a lightweight UAS is defined as a UAS having a mass of 5 pounds-400 pounds, 5 pounds-50 pounds, 25 pounds-100 pounds, 100 pounds-200 pounds, 200 pounds-300 pounds, or 300 pounds-400 pounds. The motivation for a stabilized camera when paired to the front of a drone (such as the FlightWave Edge available from FlightWave, California, USA) has resulted in a method for building a gimbal composed of three rotational stages that are ordered as "roll-pitch-roll". Control software handles the rotation of each stage to keep the camera stabilized, or level, or pointing at a target.

Overall Payload Construction

Figure 5:
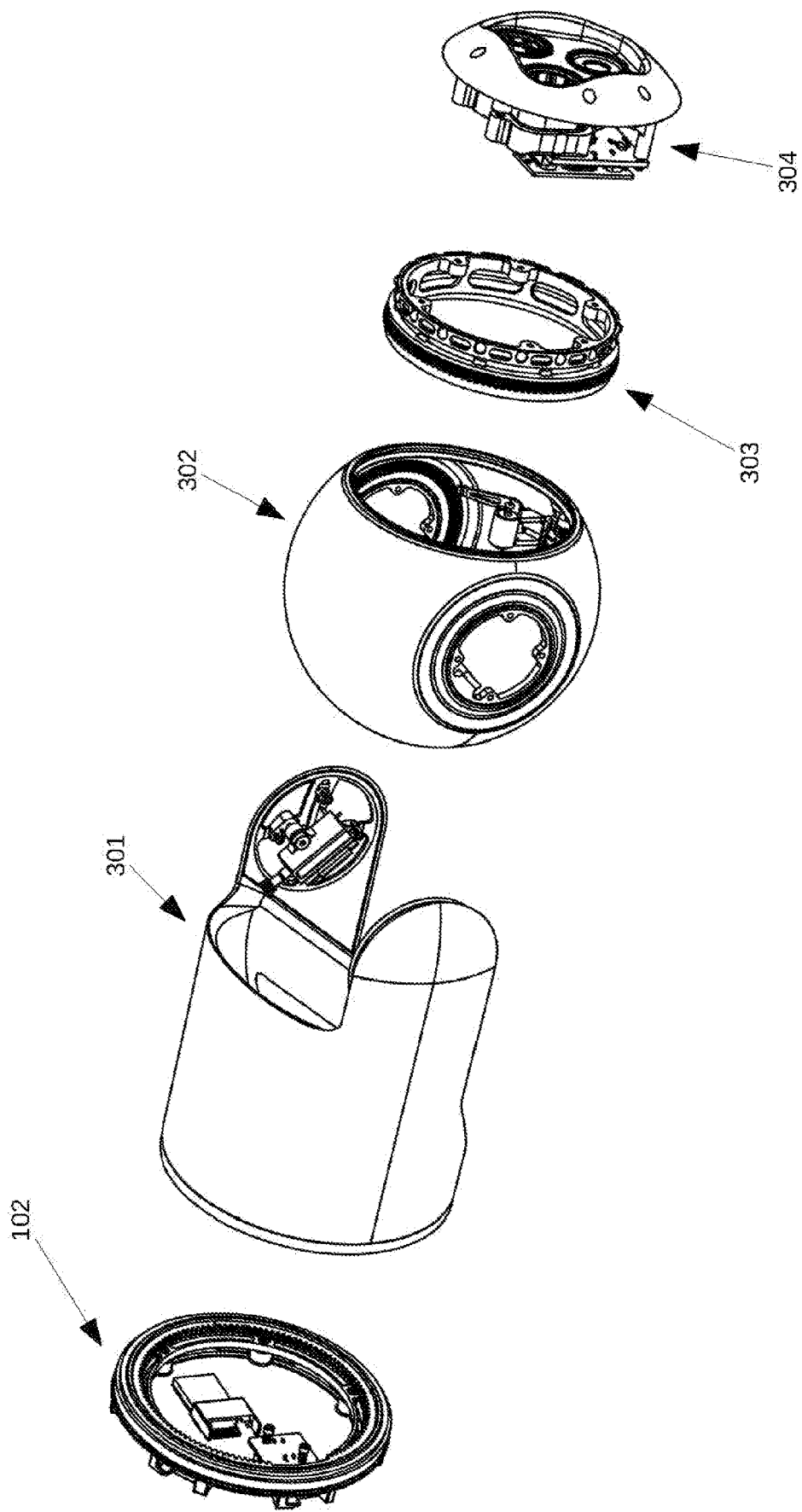
FIG. 5 illustrates a gimbal stabilized camera according to FIG. 1.

FIG. 1, FIG. 2, FIG. 3, FIG. 4, and FIG. 5 illustrate a gimbal 100 according to aspects of the disclosure. The gimbal 100 may be configured as a lightweight stabilized camera gimbal for attachment to an UAS 1010 as illustrated in FIG. 7. The gimbal 100 may include a payload wall 102 as illustrated in FIG. 5, which can be configured for tool-free mechanical retention. Additionally with reference to FIG. 6, the payload wall 102 may include electrical connections 211 for power and/or electrical connections for data. The gimbal 100 may also include and be configured to utilize a memory card 212 or data card that can be accessed when the gimbal 100 is disconnected from the UAS 1010.

Figure 19:
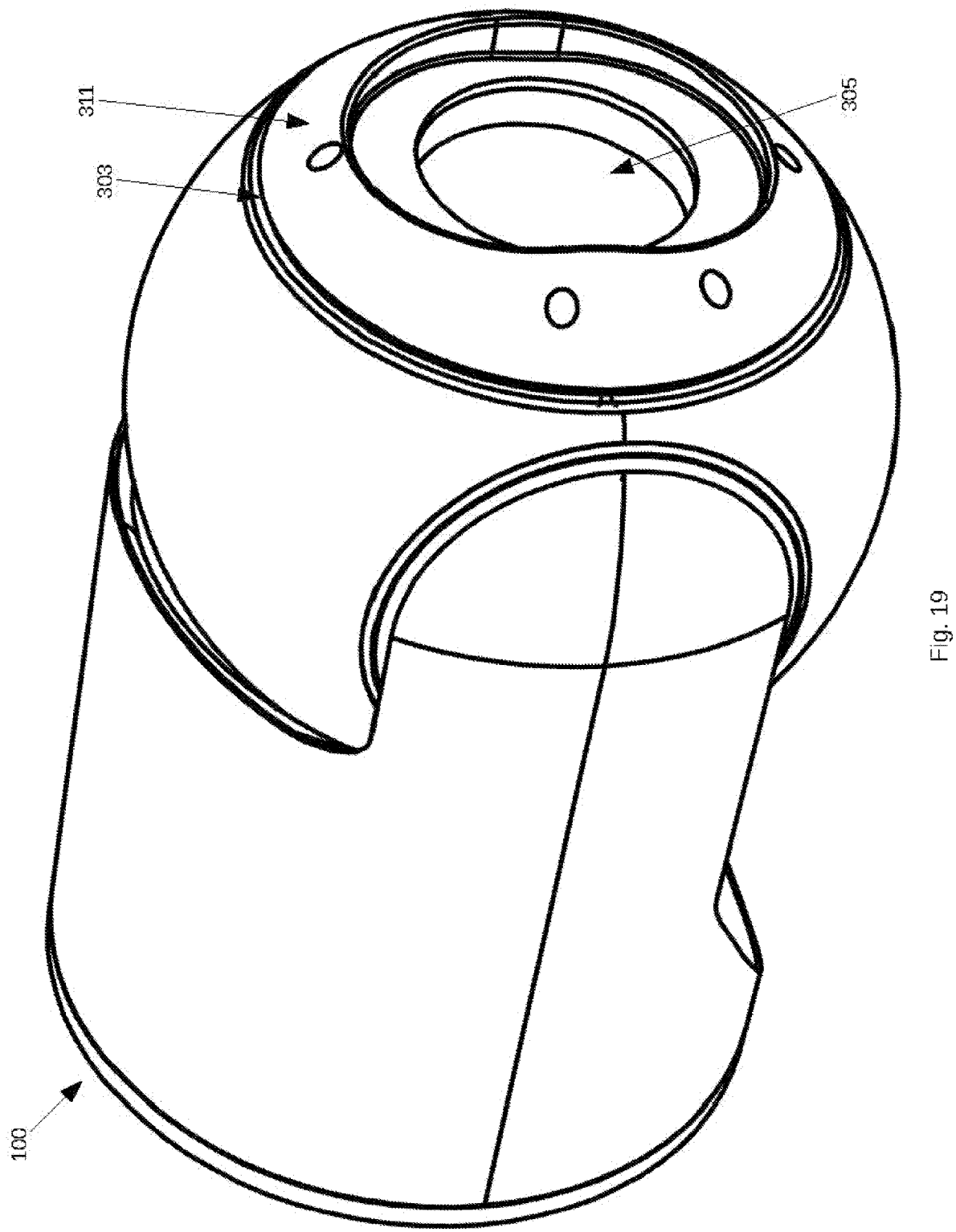
FIG. 19 illustrates another gimbal stabilized camera according to the disclosure.

With reference to FIG. 5, the gimbal 100 may also include a first rotational stage 301 (also called stage 1), a second rotational stage 302 (also called stage 2), and a third rotational stage 303 (also called stage 3). The first rotational stage 301 and the second rotational stage 302 may be constructed from a lightweight composite structure. Each stage may be configured to rotate individually allowing for three axes of rotation of the third rotational stage 303 relative to the UAS 1010. The gimbal 100 can also include a multiple sensor module implementing multiple sensors 304 as illustrated in FIG. 5 or a single sensor module implementing a single sensor 305 as illustrated in FIG. 19.

Payload Wall

Figure 6:
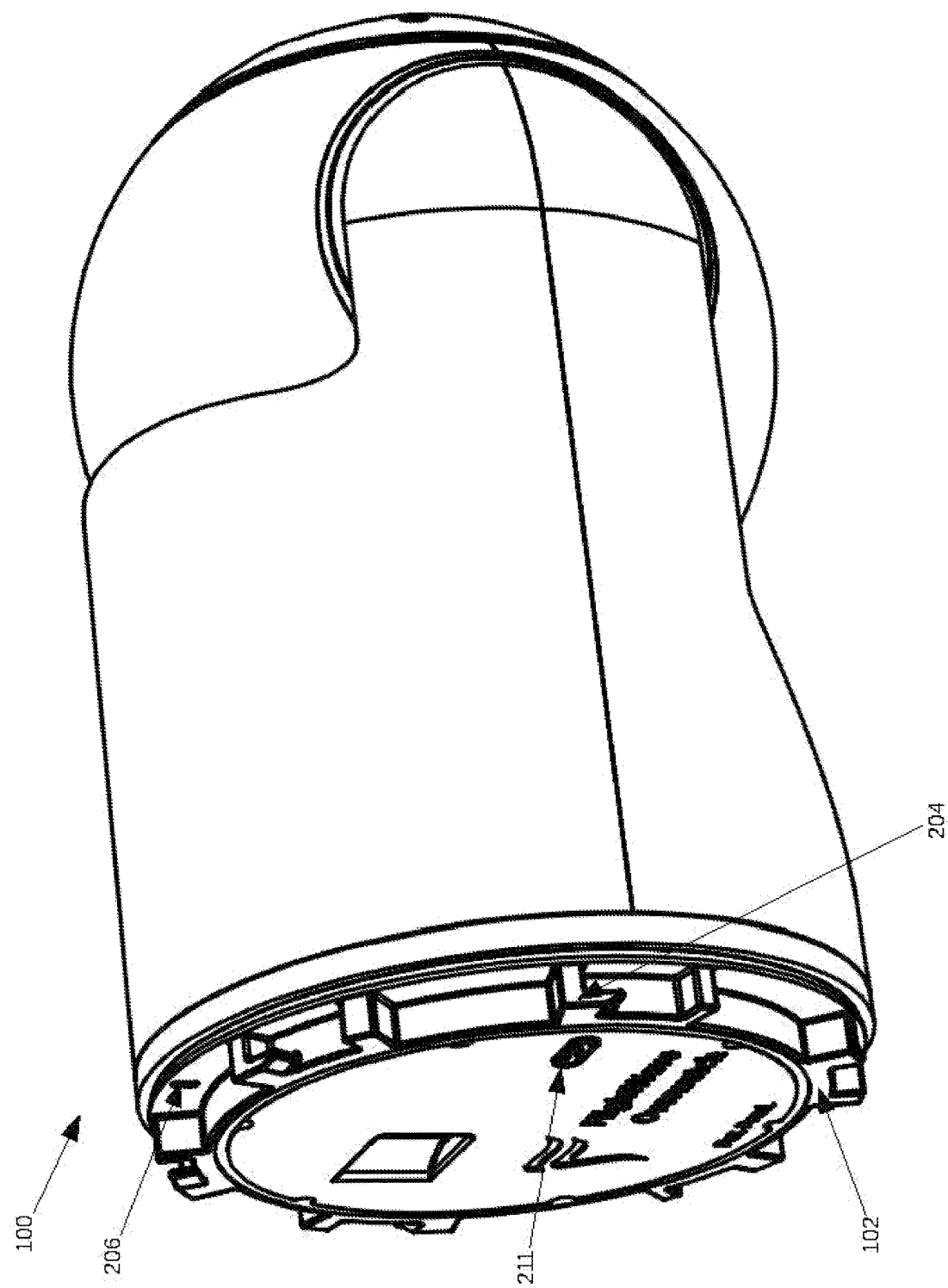
FIG. 6 illustrates a gimbal stabilized camera according to FIG. 1.
Figure 7:
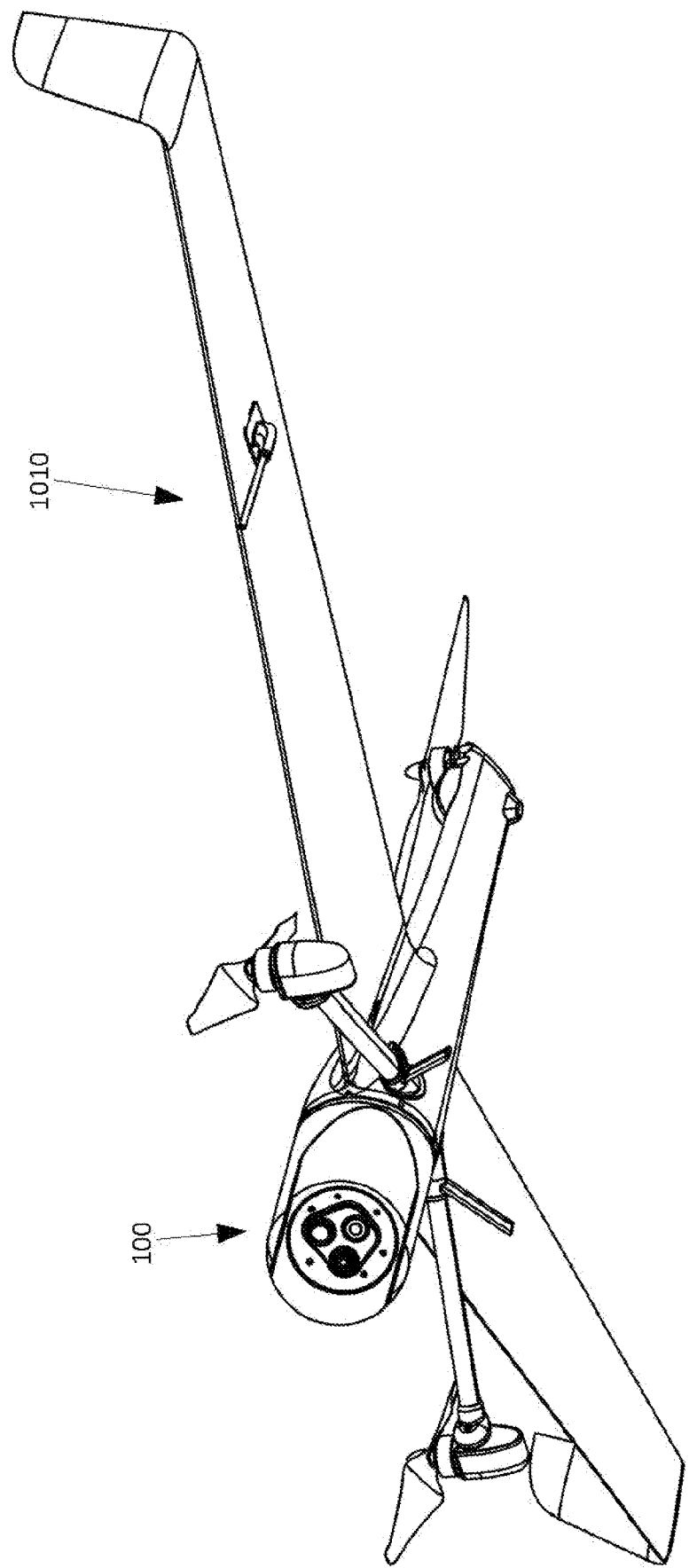
FIG. 7 illustrates an Unmanned Aircraft System (UAS) implementing a gimbal stabilized camera according to FIG. 1.
Figure 8:
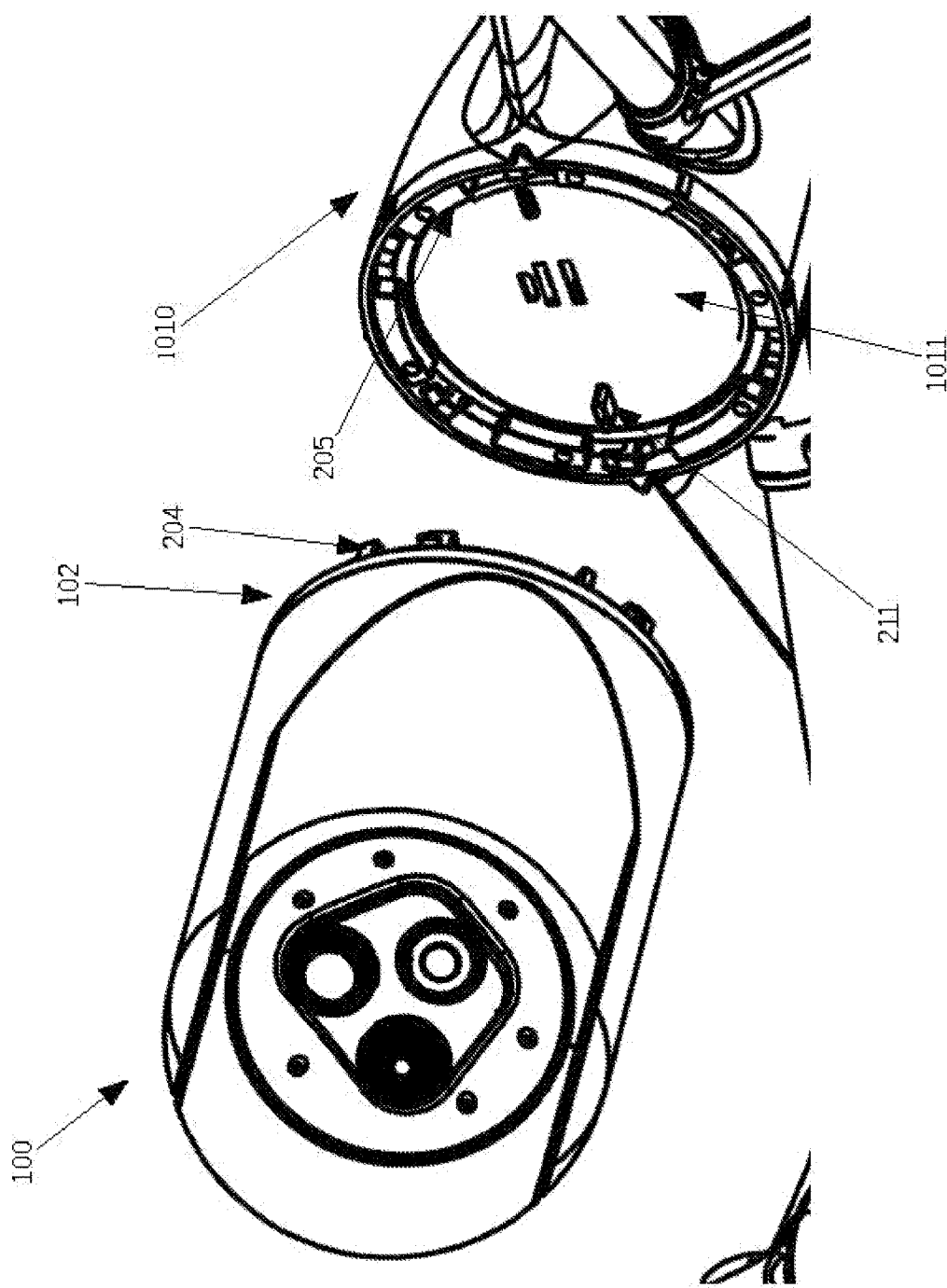
FIG. 8 illustrates a gimbal stabilized camera according to FIG. 1.

As illustrated in FIG. 6, FIG. 7, and FIG. 8, the gimbal 100 may be mounted mechanically and electrically on a front of the UAS 1010 without the use of any tools. In this regard, the payload wall 102 may include mechanical retention components 204. The mechanical retention components 204 may include portions extending from the payload wall 102 of the gimbal 100 that are configured to engage corresponding features of a latch ring 205 of the UAS 1010 as illustrated in FIG. 8. In this regard, the payload wall 102 of the gimbal 100 may be extended into the UAS 1010 such that the mechanical retention components 204 on the payload wall 102 may be inserted into corresponding features of the latch ring 205 of the UAS 1010. Thereafter, rotation of the gimbal 100, which may be indicated by an indent 206 aligning vertically, may position the mechanical retention components 204 into a locked mechanical configuration with the corresponding portions of the latch ring 205 of the UAS 1010. The mechanical retention components 204 may include arms that flex together with end portions with hooks. During rotation of the gimbal 100, the arms of the mechanical retention components 204 may flex such that the hook portions of the mechanical retention components 204 engage the corresponding portions of the latch ring 205 of the UAS 1010.

In this regard, the mechanical retention components 204 of the gimbal 100 may provide a tool free mechanism to attach the gimbal 100 to the UAS 1010. More specifically, no tools are required to insert the mechanical retention components 204 of the gimbal 100 into the latch ring 205 of the UAS 1010. Moreover, no tools are required to rotate the gimbal 100 with respect to the UAS 1010 to engage the mechanical retention components 204 with the latch ring 205. More specifically, the mechanical retention components 204 are implemented without mechanical fasteners requiring tools to tighten or loosen the same. Attachment of the gimbal 100 by the mechanical retention components 204 engaging the latch ring 205 may be configured for hand rotation of the gimbal 100 with respect to the UAS 1010 for attachment of the gimbal 100 to the UAS 1010.

FIG. 8, FIG. 9, FIG. 10, FIG. 11, and FIG. 12 show how the payload wall 102 may connect the gimbal 100 to the UAS 1010 both mechanically and electrically through a tool free mechanism. The payload wall 102 may house the electrical connections 211. The electrical connection 211 may be spring loaded to allow for a more stable and reliable electrical connection between the gimbal 100 and the UAS 1010. The electrical connections 211 may be retained by payload connector fasteners 402, such as screws, and payload connector springs 403. The electrical connection 211 may receive power from the UAS 1010 and provide the power to the gimbal 100, the one or more computers 110, and/or the like. Additionally, the electrical connection 211 may transfer data between the UAS 1010, the gimbal 100, the one or more computers 110, and/or the like. In this regard, the electrical connections 211 of the gimbal 100 may provide a tool free mechanism to electrically connect the gimbal 100 to the UAS 1010. More specifically, no tools are required to connect the electrical connections 211 of the gimbal 100 to corresponding electrical connections of the UAS 1010. More specifically, the electrical connections 211 may be implemented without mechanical fasteners requiring tools to tighten or loosen the same.

Figure 9:
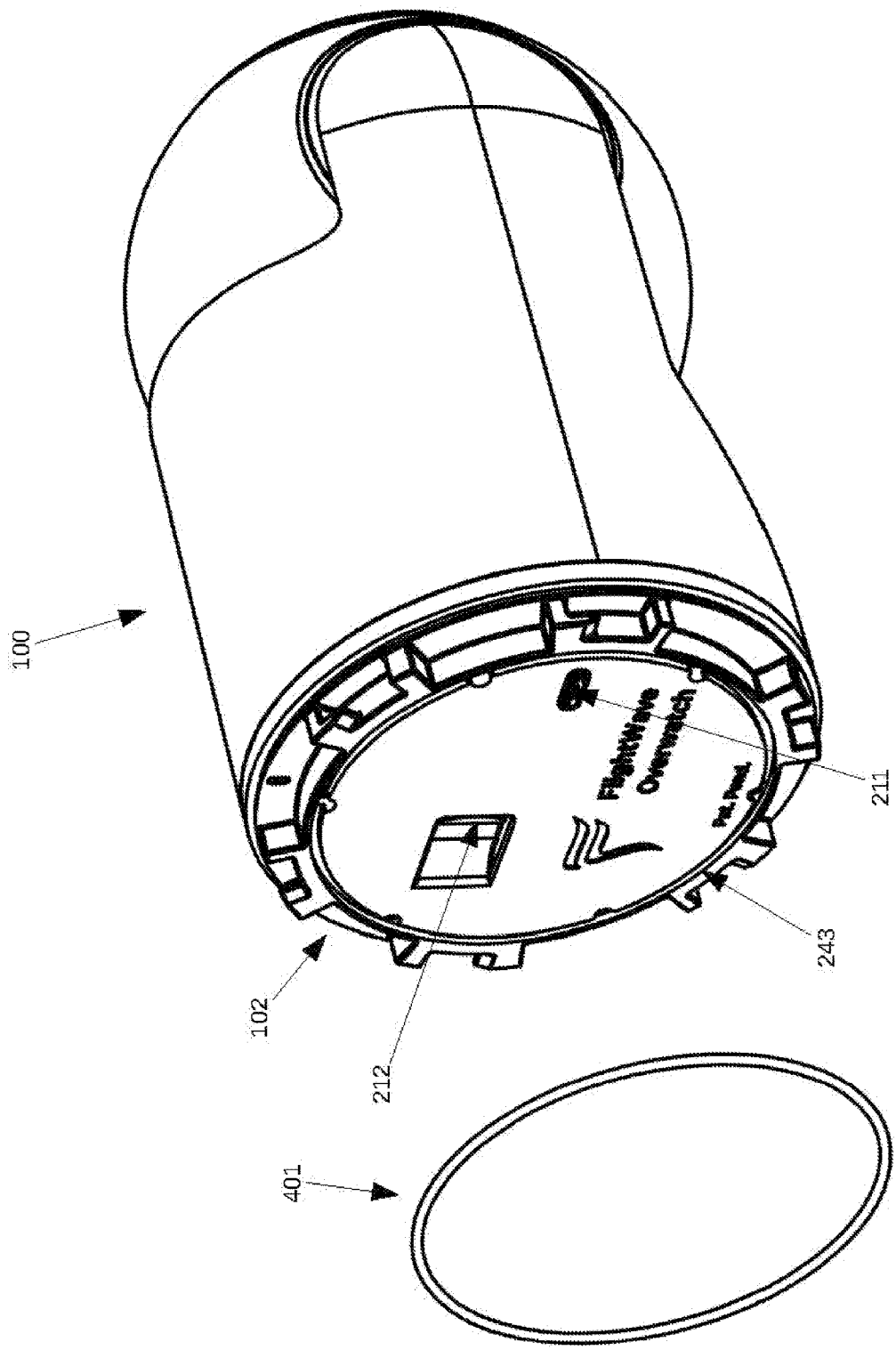
FIG. 9 illustrates a gimbal stabilized camera according to FIG. 1.
Figure 10:
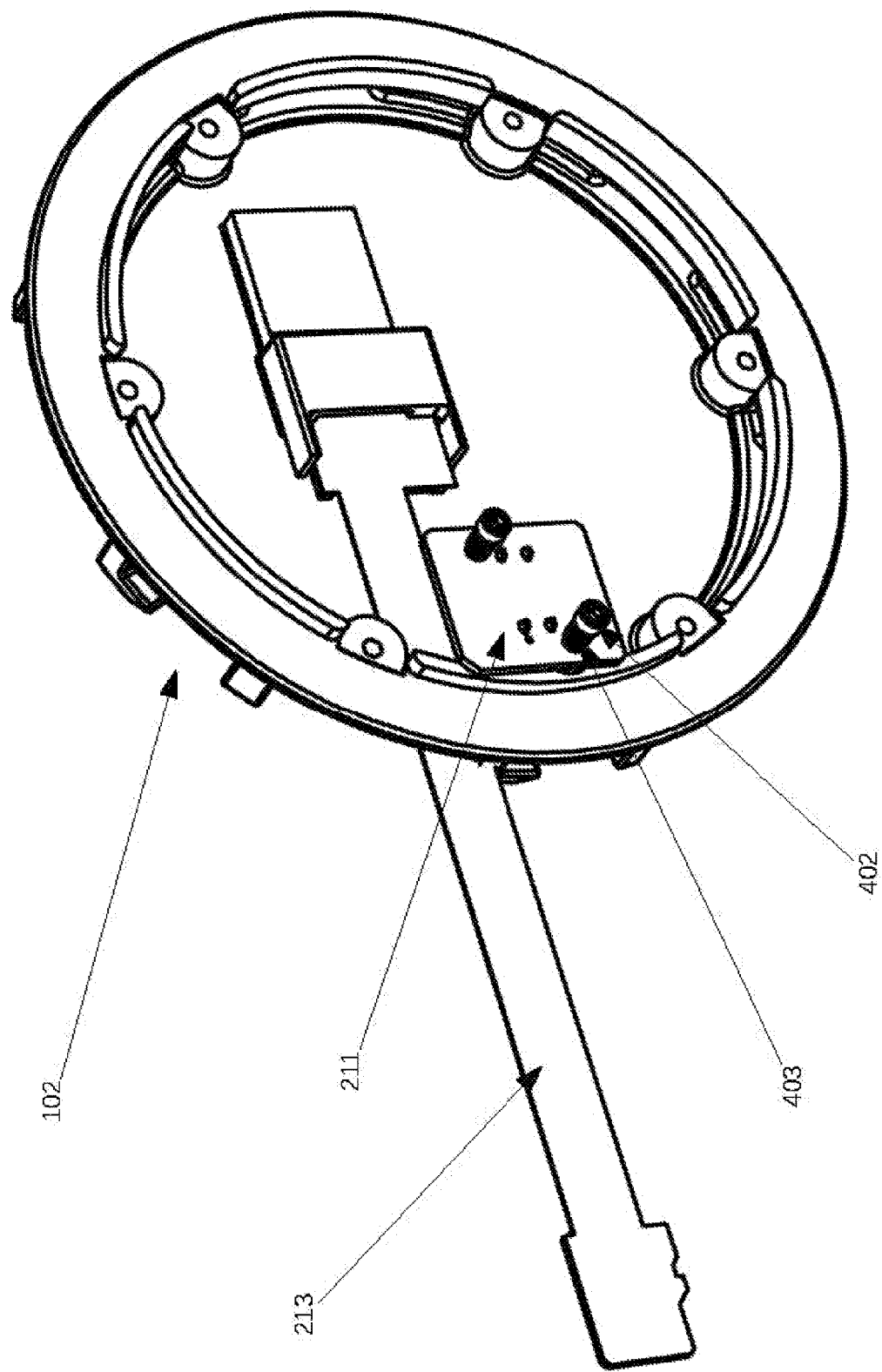
FIG. 10 illustrates a gimbal stabilized camera according to FIG. 1.
Figure 11:
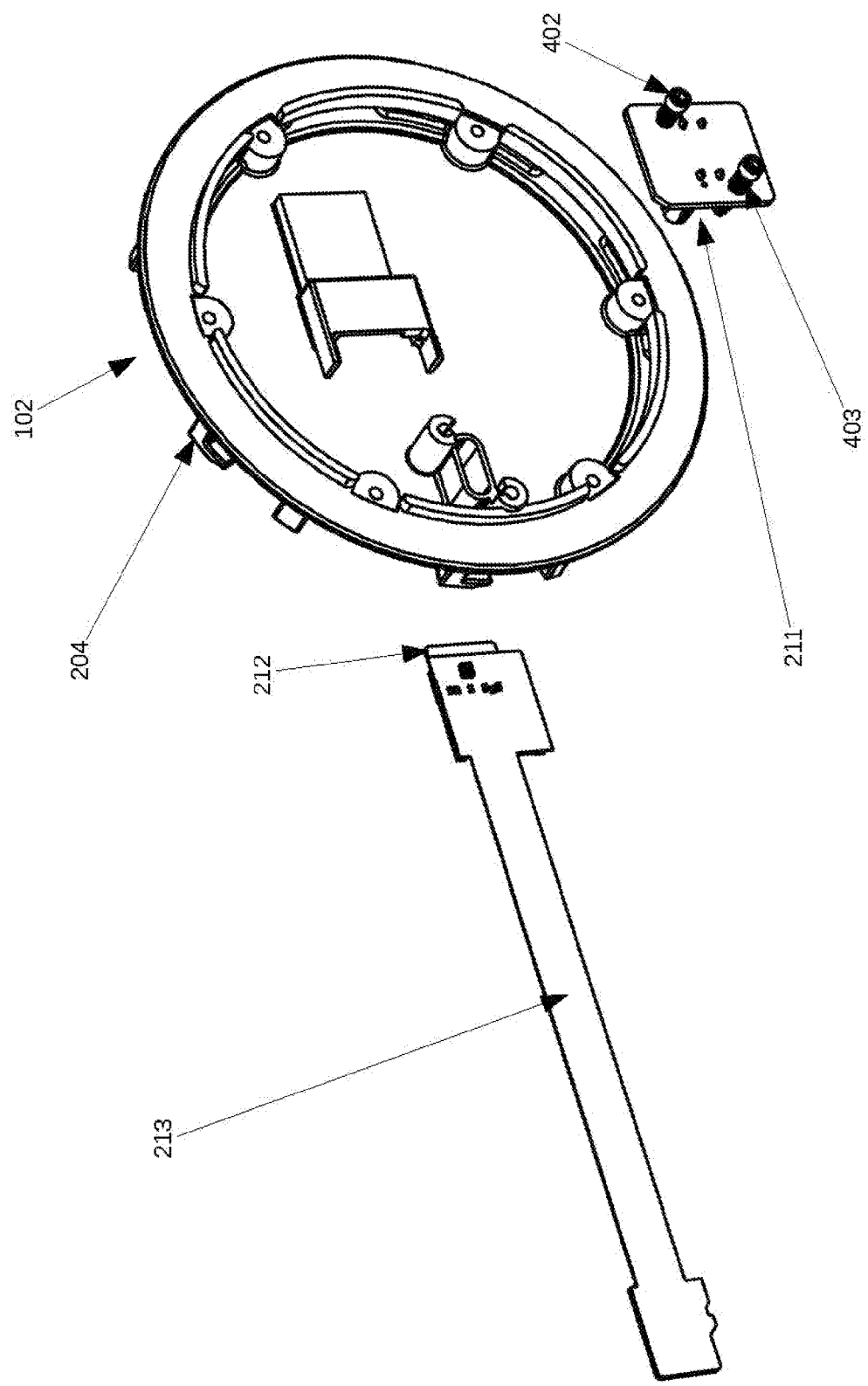
FIG. 11 illustrates a gimbal stabilized camera according to FIG. 1.

As illustrated in FIG. 9, the gimbal 100 may also implement and provide a seal 401 between the UAS 1010 and the gimbal 100. In aspects, the seal 401 may be located and/or retained in a groove 243 located in the payload wall 102 of the gimbal 100

The payload wall 102 may house the memory card 212 that may be configured to be accessed by the user when the gimbal 100 is not connected to the UAS 1010. In this regard, removal of the gimbal 100 from the UAS 1010 may allow a user to gain access to the memory card 212. In aspects, the memory card 212 may be connected to a memory card extension cable 213 routed through the payload wall 102 to one or more computers 110. In aspects, the memory card 212 may be implemented utilizing a CFexpress standard for removable media cards implementing a PCIe 3.0 interface. In aspects, the memory card 212 may be implemented utilizing a microSD removable miniaturized Secure Digital flash memory card. In aspects, the memory card 212 may be implemented utilizing a secure Digital (SD) Memory Card.

Composite Construction

Figure 13:
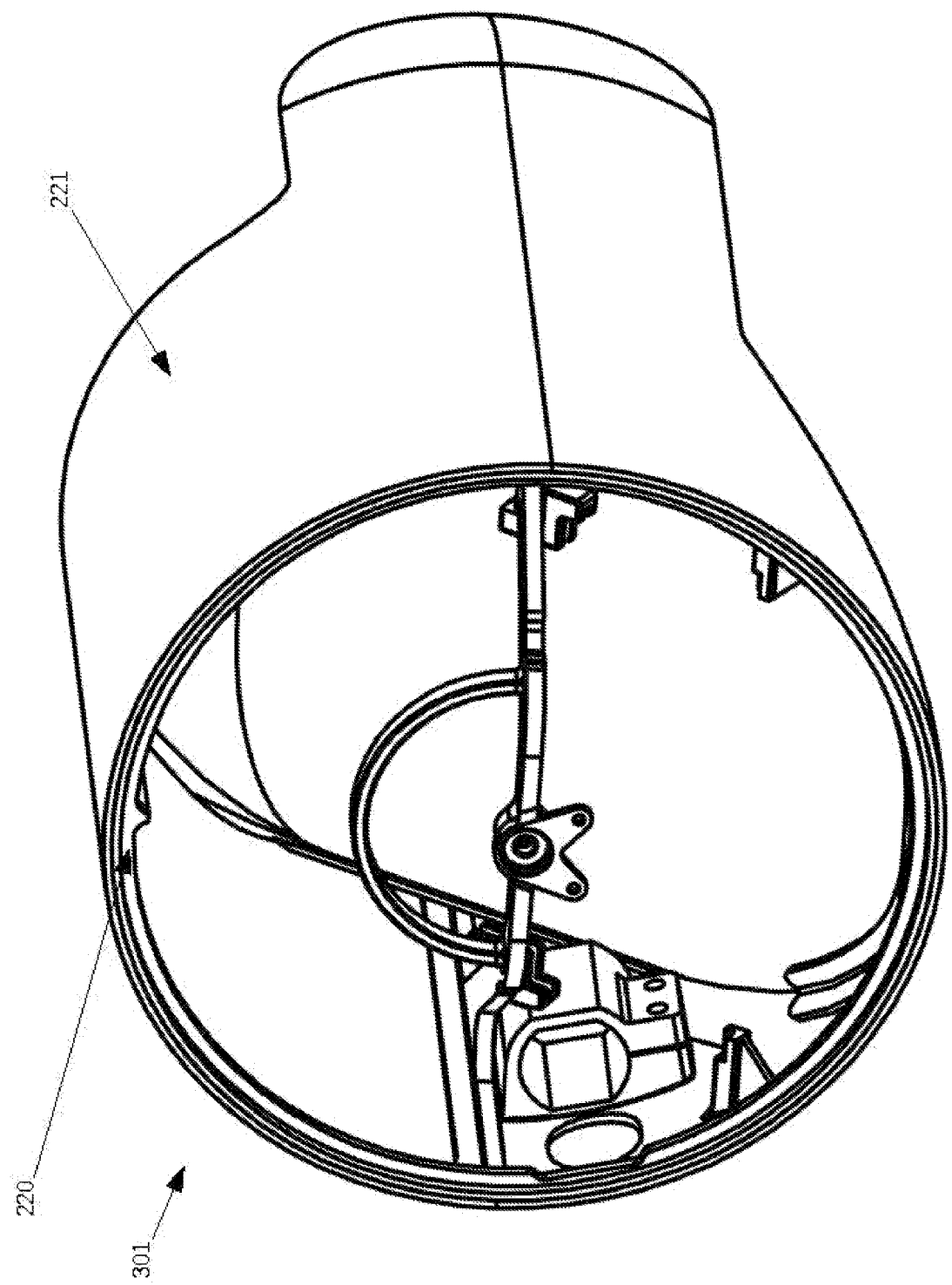
FIG. 13 illustrates a gimbal stabilized camera according to FIG. 1.
Figure 14:
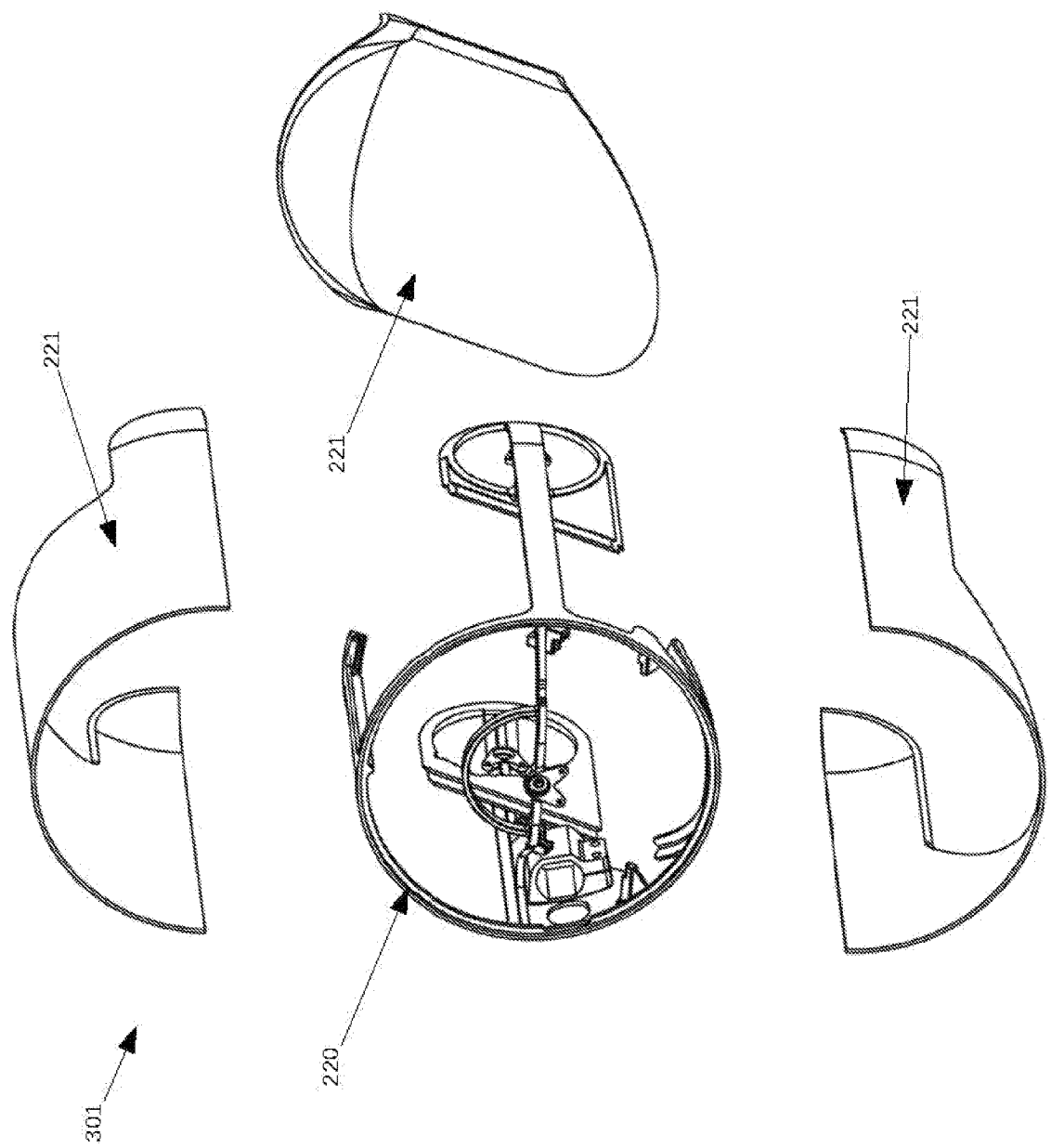
FIG. 14 illustrates a gimbal stabilized camera according to FIG. 1.

FIG. 13 and FIG. 14 show the lightweight composite construction of the gimbal 100. The construction of the gimbal 100 may include composite skins 221 bonded to an internal structure 220. The first rotational stage 301 and the second rotational stage 302 may be constructed in this manner. The composite skins 221 may allow for a rigid waterproof and/or water resistant structure while keeping the structure lightweight. The material used in the composite skins 221 may also allow for heat dissipation through the skin into the open air. The composite skins 221 may include bonded fabric, a metal, a synthetic material, and/or the like.

The bonded construction may include an adhesive. In aspects, a fabrication attach process may utilize an adhesive to form a connection. In particular, the fabrication attach process may utilize an adhesive bonding process that may include applying a layer to connect surfaces. The adhesive may be organic or inorganic; and the adhesive may be deposited on one or more surfaces. The adhesive may be utilized in an adhesive bonding process that may include applying adhesive material with a particular coating thickness, at a particular bonding temperature, for a particular processing time while in an environment that may include applying a particular tool pressure. The internal structure 220 may be composed of a plastic, or any similar material. As for the bond, it can be composed of an epoxy with or without an epoxy thickener, or any other type of glue compatible with the materials it is bonding to. The composite skins 221 may be a single layer fiberglass or multiple layers of fiberglass or carbon fiber sheets of an array of weights, weaves, and orientations. Additionally, the composite skins 221 may or may not include a core made from an array of materials that can include foam, Kevlar, aluminum, and/or the like.

Computer

Figure 15:
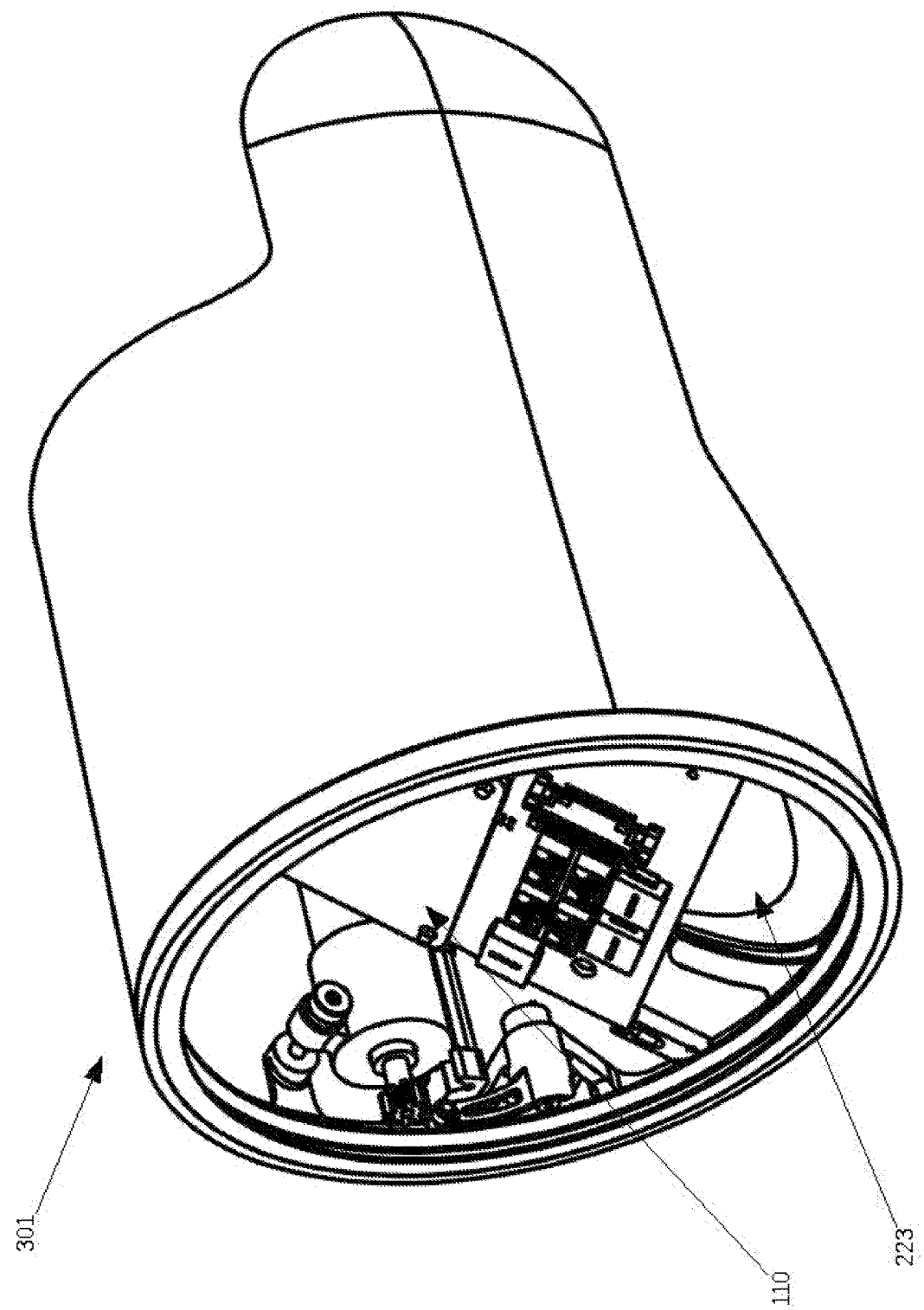
FIG. 15 illustrates a gimbal stabilized camera according to FIG. 1.
Figure 16:
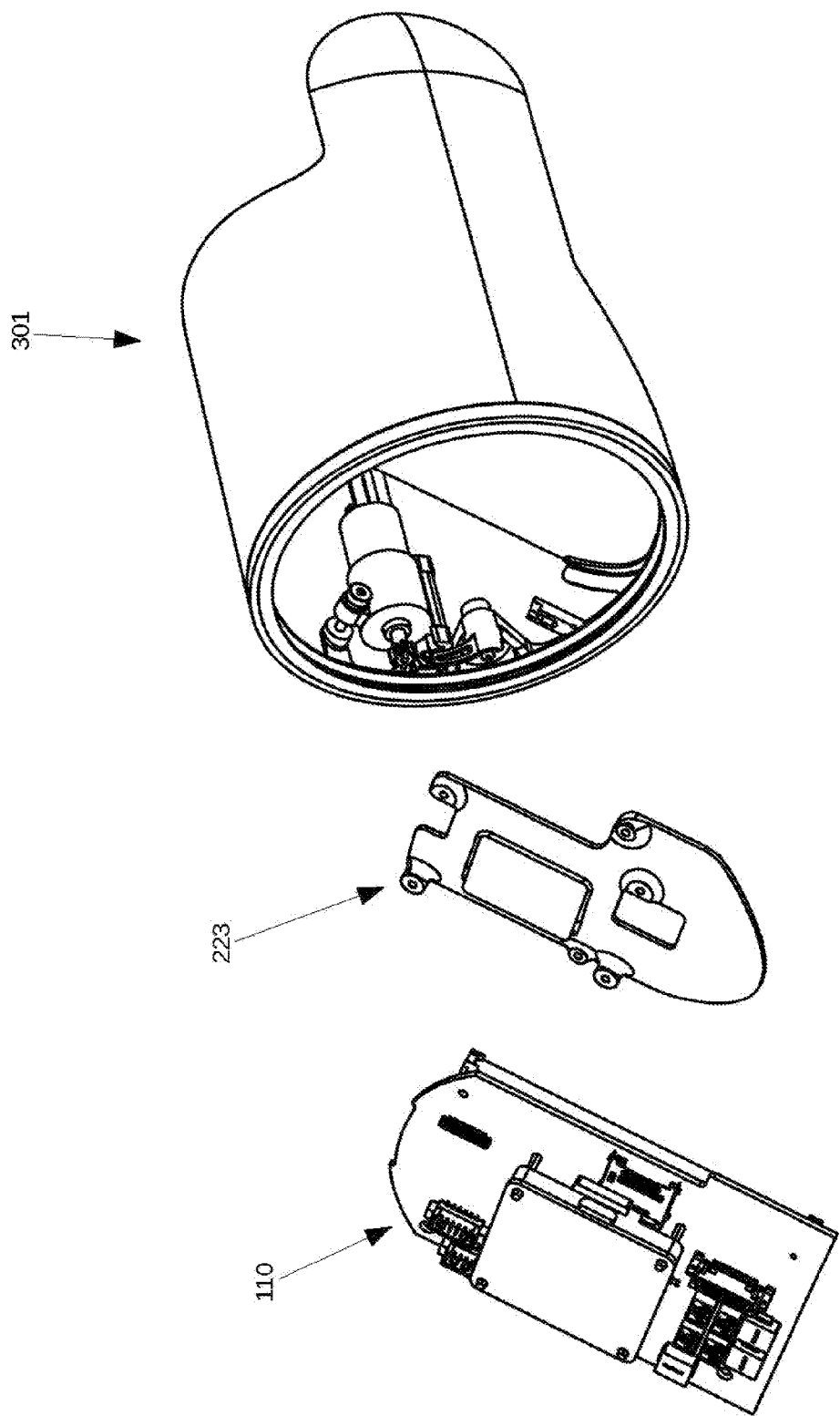
FIG. 16 illustrates a gimbal stabilized camera according to FIG. 1.

As illustrated in FIG. 15 and FIG. 16, the first rotational stage 301 may house the one or more computers 110. The one or more computers 110 may be installed with and thermally coupled with a heat sink 223 that can be further thermally coupled to the composite skin 221 and configured to transfer heat from the one or more computers 110 to the outside air. Positioning of the gimbal 100 on the front of the UAS 1010 may allow for air to flow across the composite skin 221 and cool the composite skin 221, which in turn may cool the heat sink 223, which in turn may cool the one or more computers 110. All and/or a portion of various joints between heat transferring materials, such as the composite skin 221, the heat sink 223, and/or the one or more computers 110 may be filled with a thermal transfer compound to improve heat transfer efficiency.

The one or more computers 110 may be implemented as a computer module that may implement a single computer system, a single processor, and/or the like configured to provide the functionality of the vision computer, the targeting computer, and/or the like. In yet further aspects, the vision computer and/or the targeting computer may implement a plurality of computer systems, a plurality of processors, and/or the like.

The computer module implemented by the one or more computers 110 may be configured and/or available to the payload to run software needed for the collection of data from sensors, such as the multiple sensors 304 and/or the single sensor 305, analysis of that data in real time using any number of algorithms including computer vision, machine learning algorithms, and/or the like and transmission of that data in real time either directly from within the payload or indirectly through the utilization of networks and radios made available by the UAS 1010 through the electrical connections 211 that may be implemented as a payload connector, and/or storing the data to removable data storage devices such as a removable implementation of the memory card 212, a data storage card, and/or internally within on board storage of the computer module implementing the one or more computers 110.

A system of the one or more computers 110 can be configured to perform particular operations or actions by virtue of having software, firmware, hardware, or a combination of them installed on the one or more computers 110 of the gimbal 100 that in operation causes or cause the gimbal 100 and/or the one or more computers 110 to perform the actions described herein. One or more computer programs can be configured to perform particular operations or actions by virtue of including instructions that, when executed by the one or more computers 110, cause the one or more computers 110 of the gimbal 100 to perform the actions.

Sensors

Figure 17:
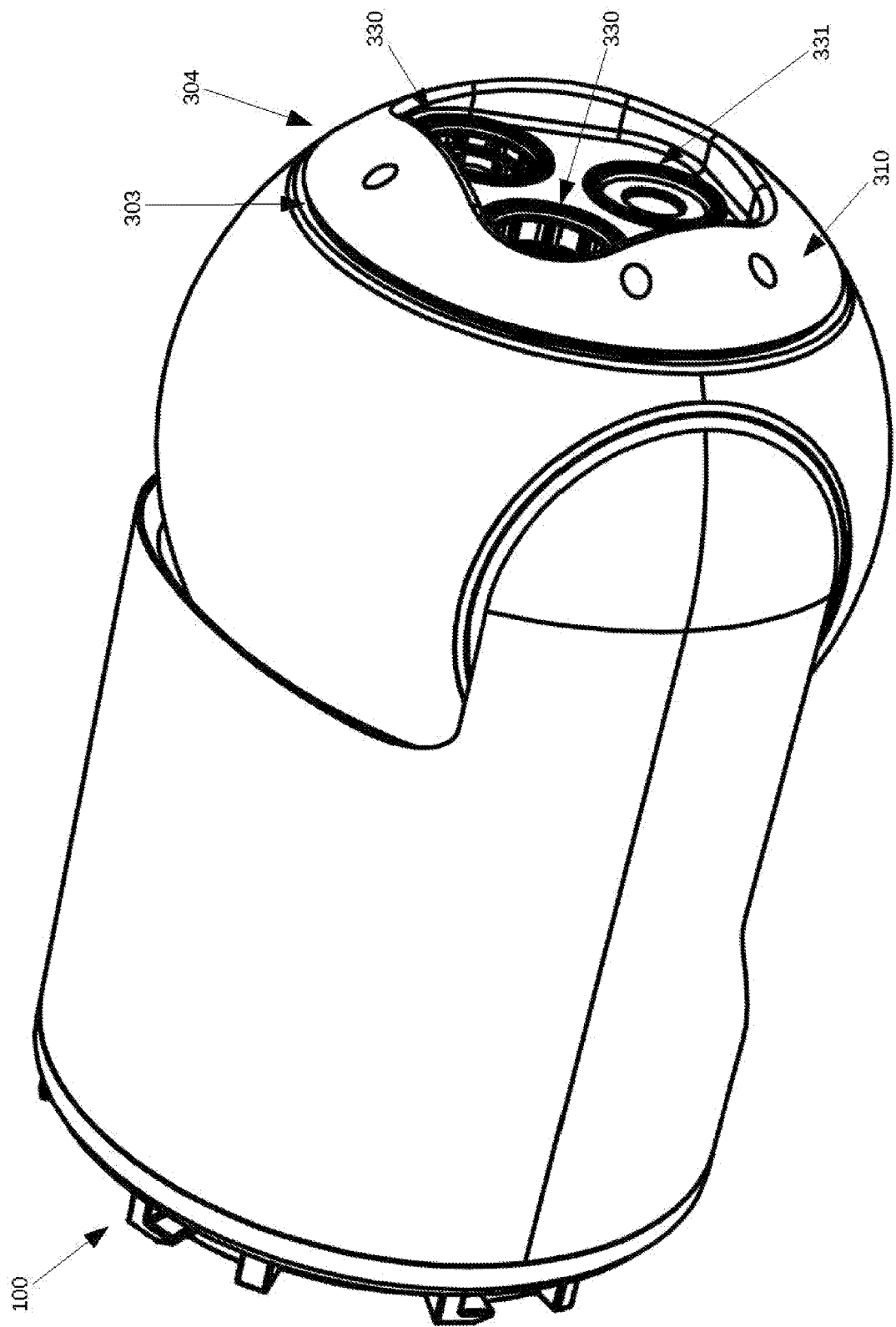
FIG. 17 illustrates a gimbal stabilized camera according to FIG. 1.
Figure 18:
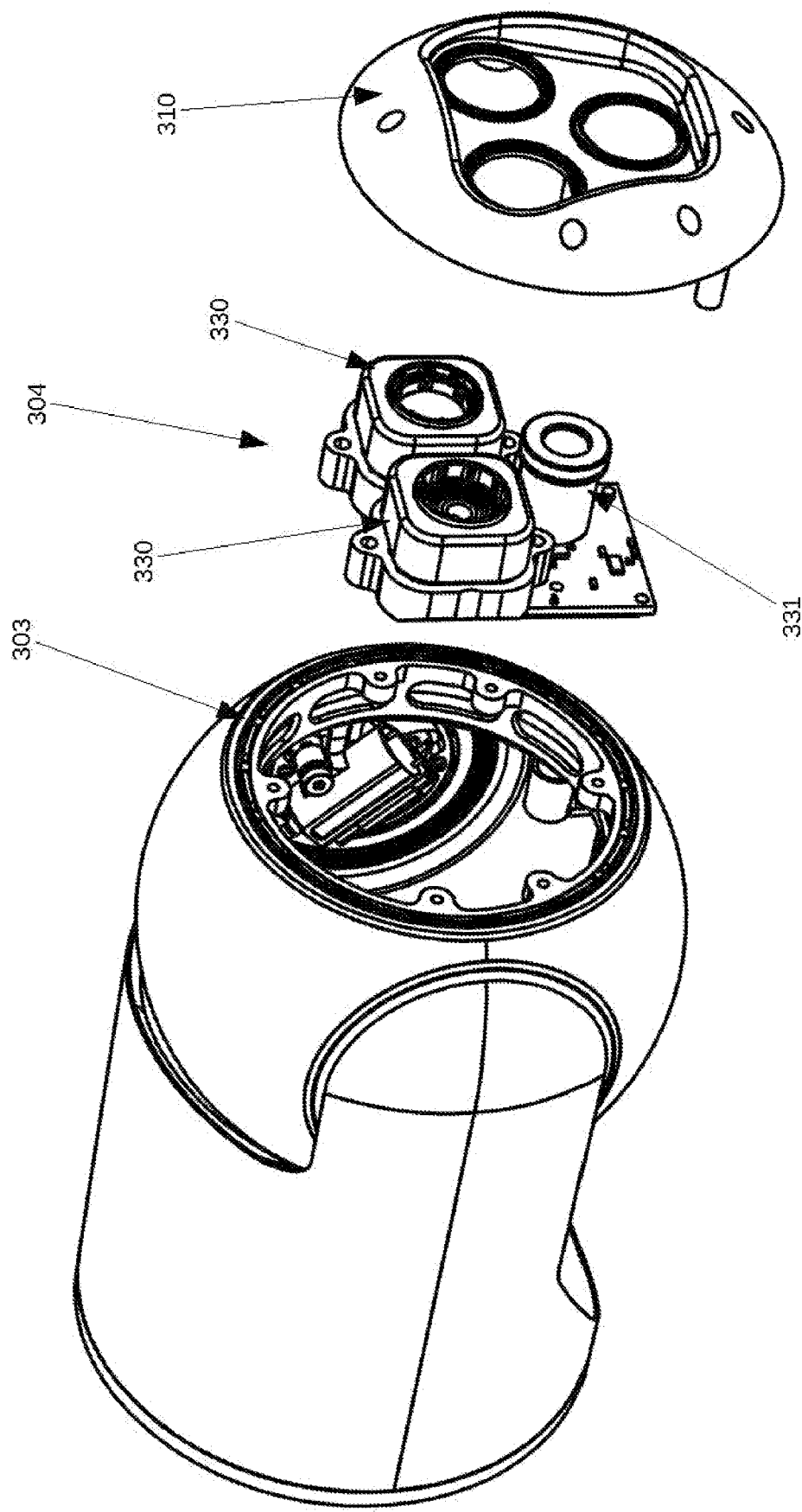
FIG. 18 illustrates a gimbal stabilized camera according to FIG. 1.
Figure 20:
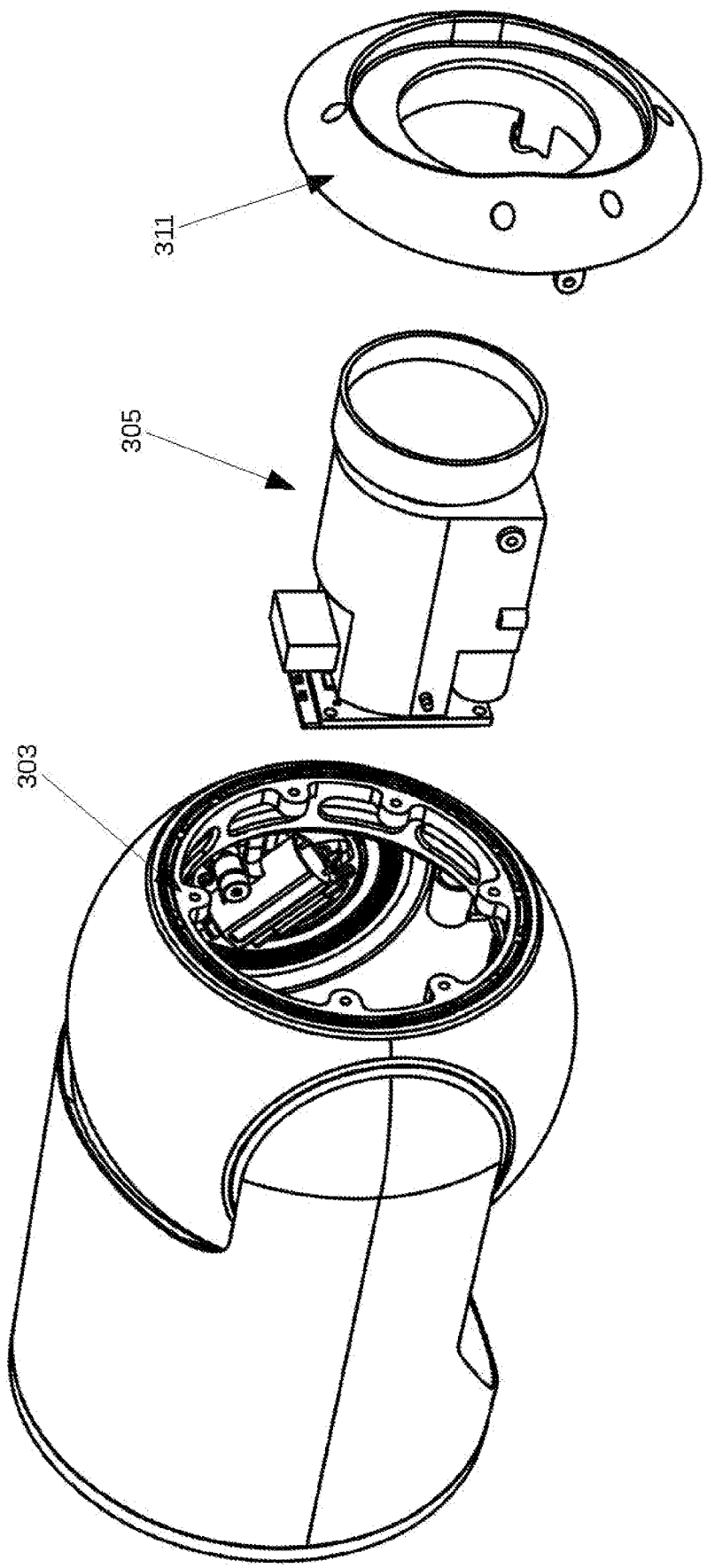
FIG. 20 illustrates a gimbal stabilized camera according to FIG. 19.

FIG. 17 and FIG. 18 illustrate how the multiple sensors 304 may be housed in the gimbal 100. The multiple sensors 304 may be housed in a multiple sensor housing 310 and installed on the third rotational stage 303. In aspects, the multiple sensor housing 310 may be constructed of plastic or other synthetic materials. For example, an array of a thermal camera 330 and a color camera 331 may be implemented in the multiple sensors 304. The multiple sensors 304 may be installed and configured such that there may be a waterproof and/or water resistant seal between the multiple sensors 304 and the sensor housing 310. The design and configuration of the gimbal 100 may allow for different sensor packages to be installed on an end of the third rotational stage 303. For example, FIG. 19 and FIG. 20 show how the single sensor 305 may be installed in the gimbal 100. In this regard, a single sensor implementation of a sensor housing 311 may be used to install the single sensor 305 into the third rotational stage 303 of the gimbal 100. In aspects, the sensor housing 311 may be constructed of a plastic material, a synthetic material, and/or the like The single sensor 305 may be configured and installed in the gimbal 100 to provide a waterproof seal between the single sensor 305 and the sensor housing 311. Additionally, aspects of the gimbal 100 illustrated in FIG. 19 and FIG. 20 include any one or more of the aspects described and illustrated herein.

The multiple sensors 304, or the single sensor 305 can be connected via a cable running to the one or more computers 110 to transfer data such as video streaming data, camera control data, and/or the like.

Gimballing

Figure 21:
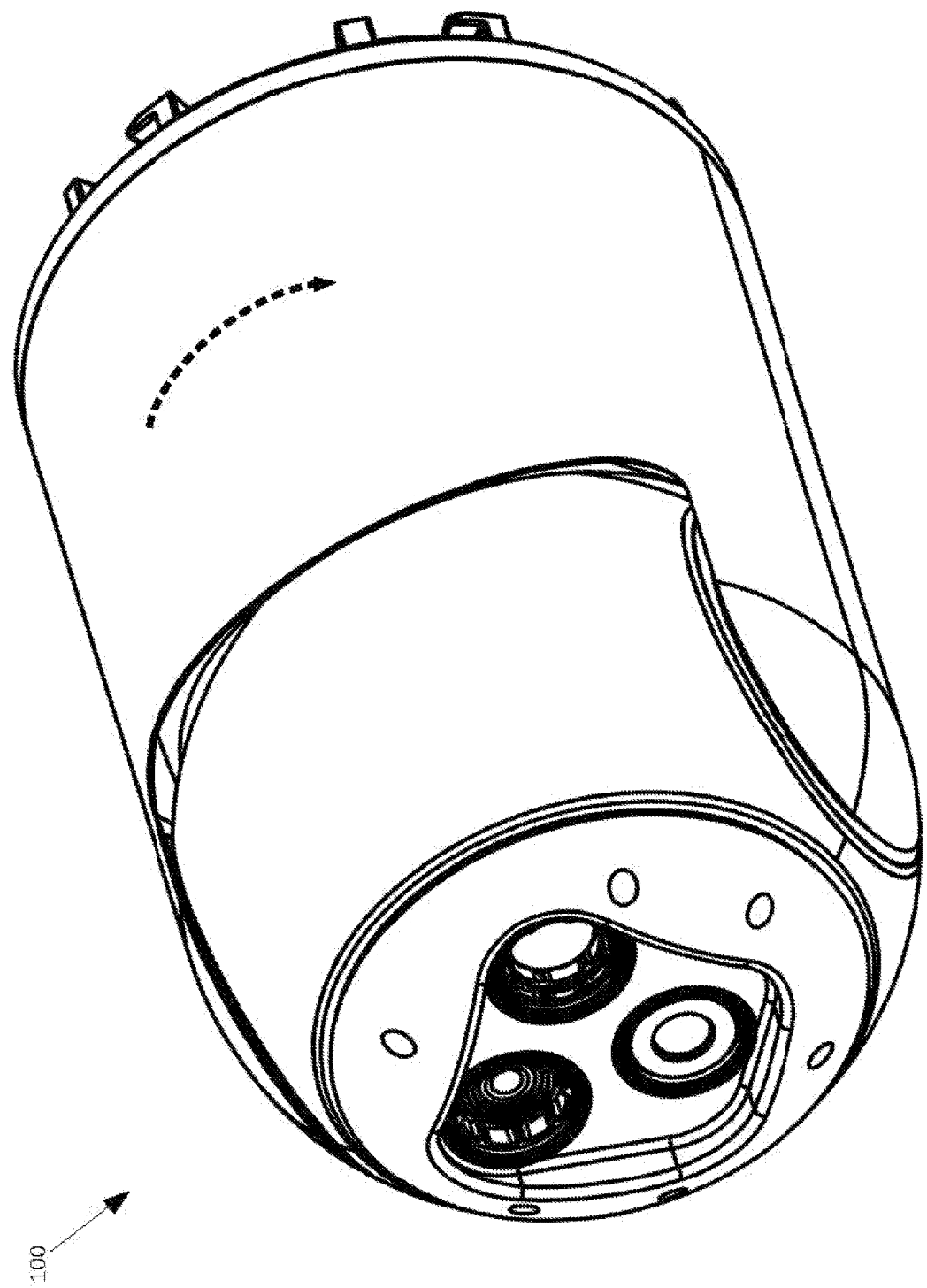
FIG. 21 illustrates a gimbal stabilized camera according to FIG. 1.
Figure 22:
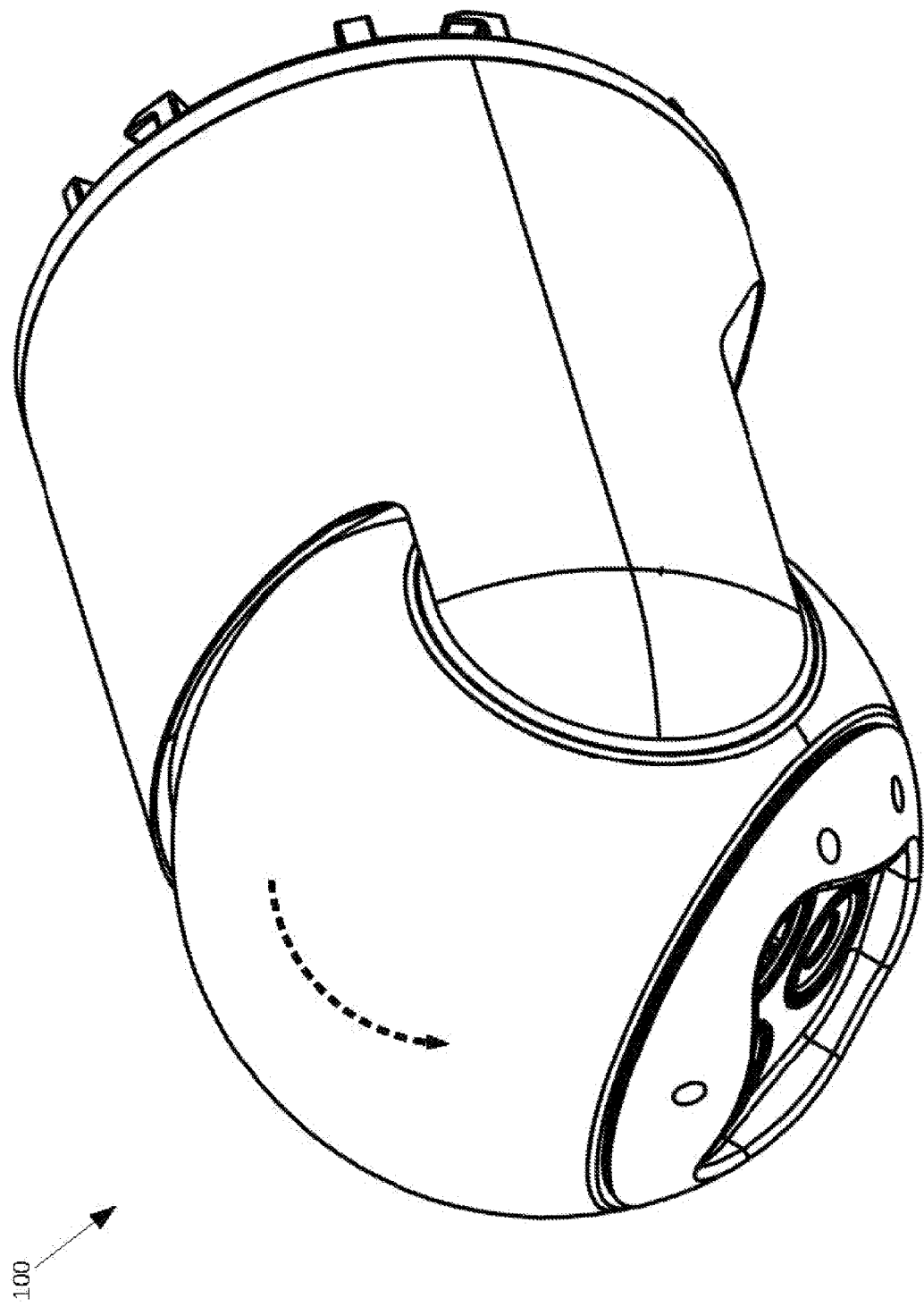
FIG. 22 illustrates a gimbal stabilized camera according to FIG. 1.
Figure 23:
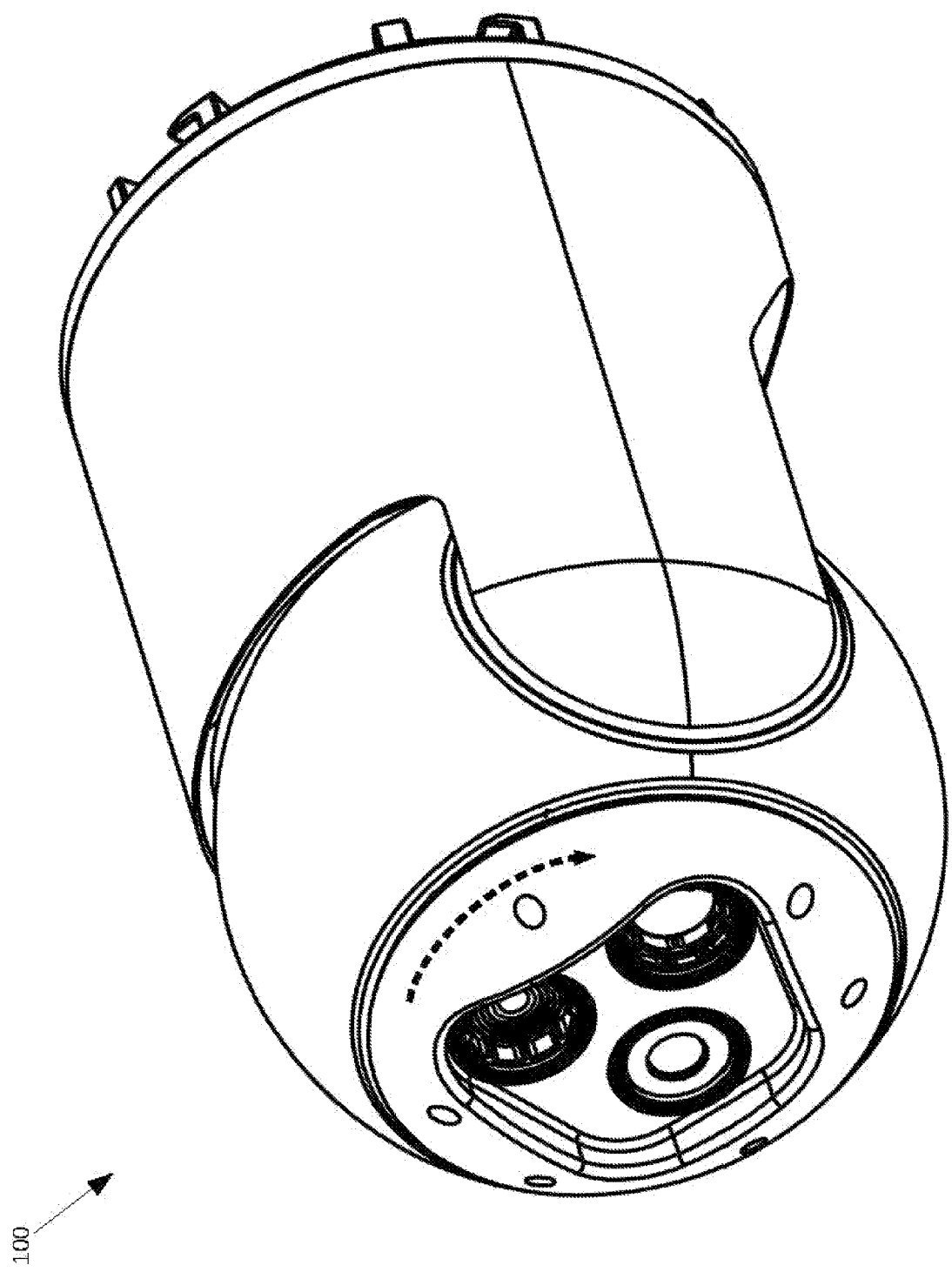
FIG. 23 illustrates a gimbal stabilized camera according to FIG. 1.

FIG. 21, FIG. 22, and FIG. 23 illustrate with dashed arrows the individual motions each of the stages may be configured to implement. A combination of motors, gears, sensing devices, computers, and/or the like housed in each stage may allow for smooth rotation of each of the three stages. Each stage can be configured to rotate independently and may be guided by the one or more computers 110.

FIG. 21 shows a first roll capability implemented by the first rotational stage 301. The structure, implementation, and function of the first roll capability is described below in connection with at least FIG. 28 and FIG. 29.

FIG. 22 shows a pitch capability implemented by the second rotational stage 302. The structure, implementation, and function of the pitch capability is described below in connection with at least FIG. 31 and FIG. 32.

FIG. 23 shows a final roll capability implemented by the third rotational stage 303. The structure, implementation, and function of the final roll capability is described below in connection with at least FIG. 34 and FIG. 35.

Figure 24:
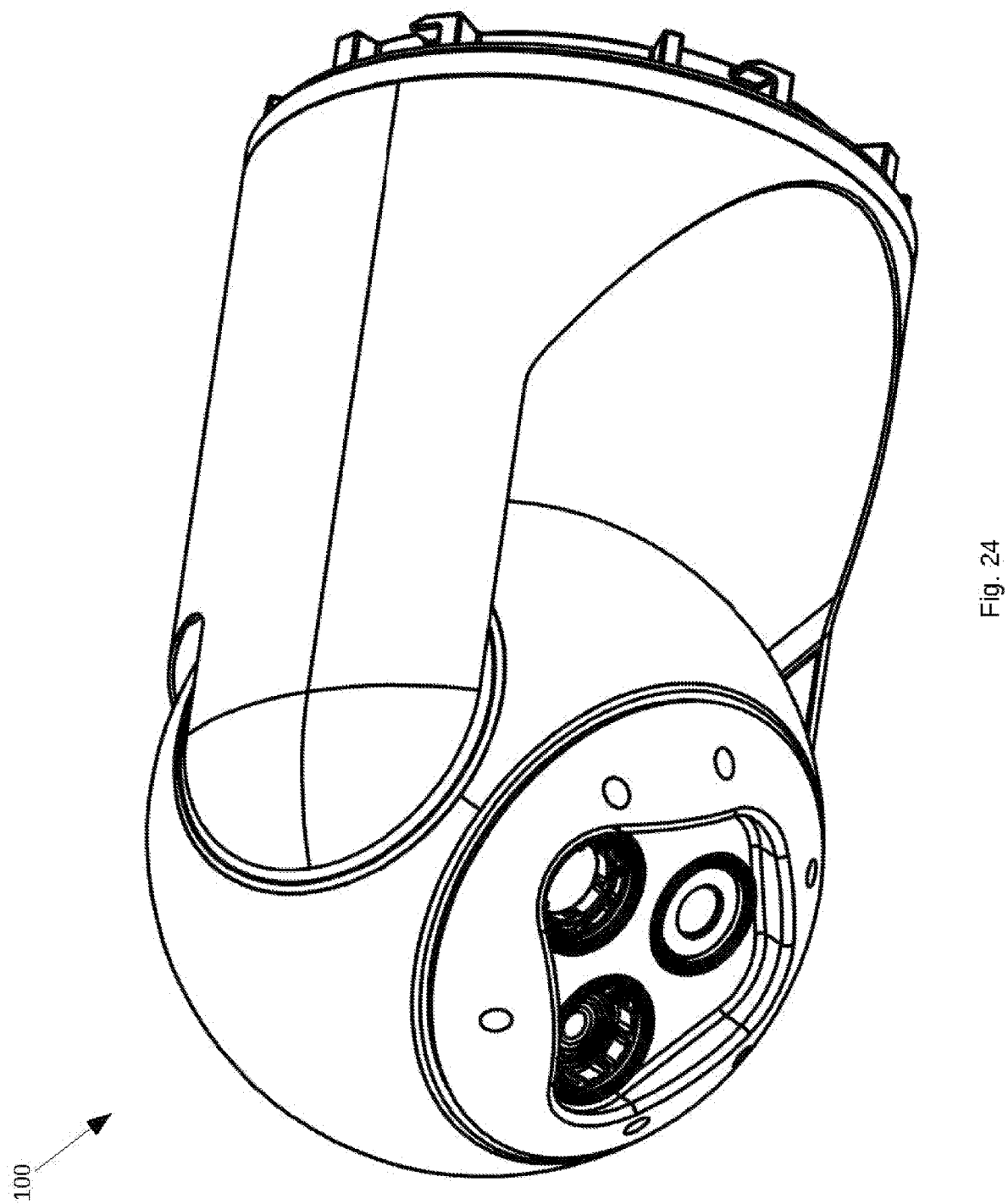
FIG. 24 illustrates a gimbal stabilized camera according to FIG. 1.
Figure 25:
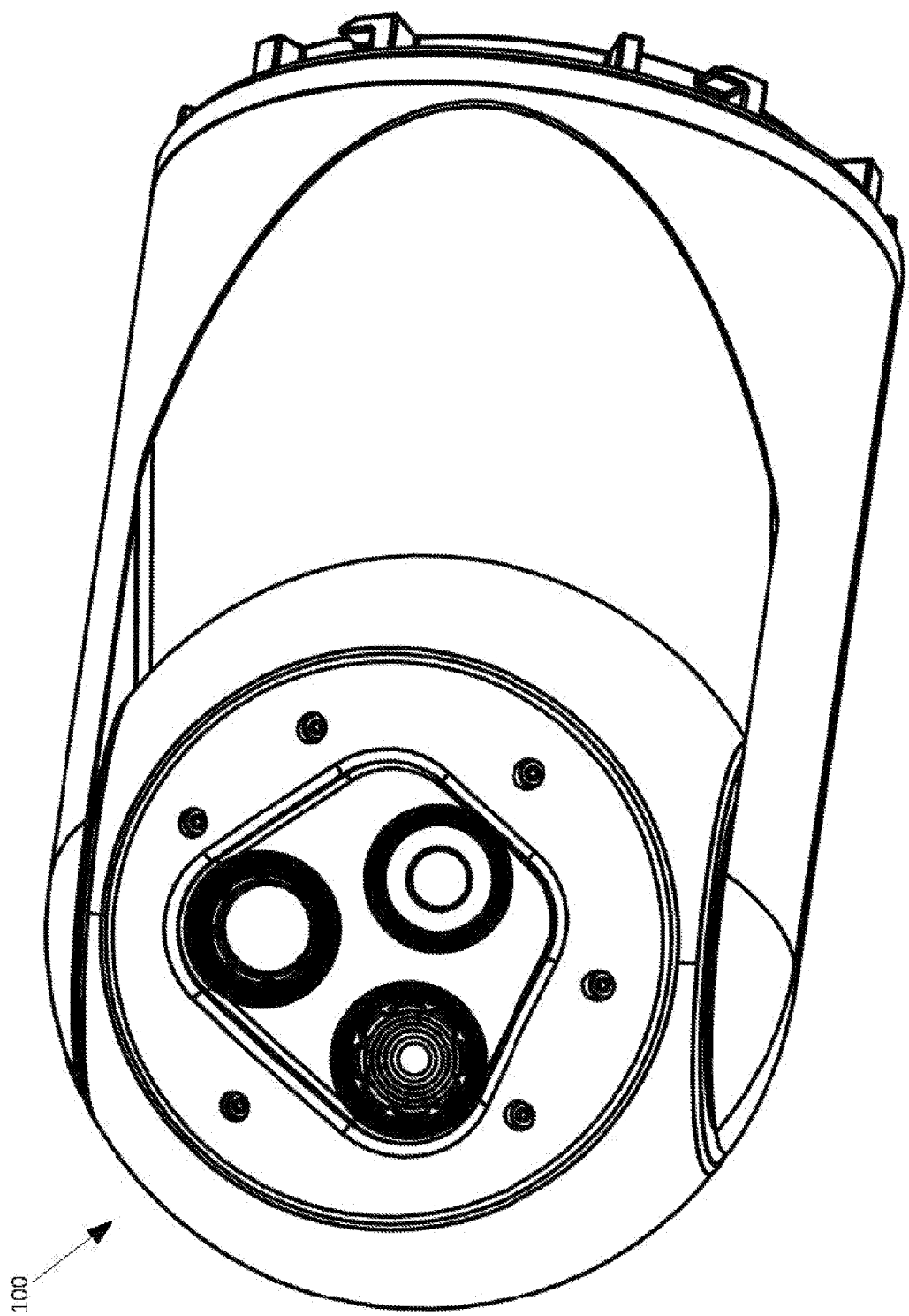
FIG. 25 illustrates a gimbal stabilized camera according to FIG. 1.
Figure 26:
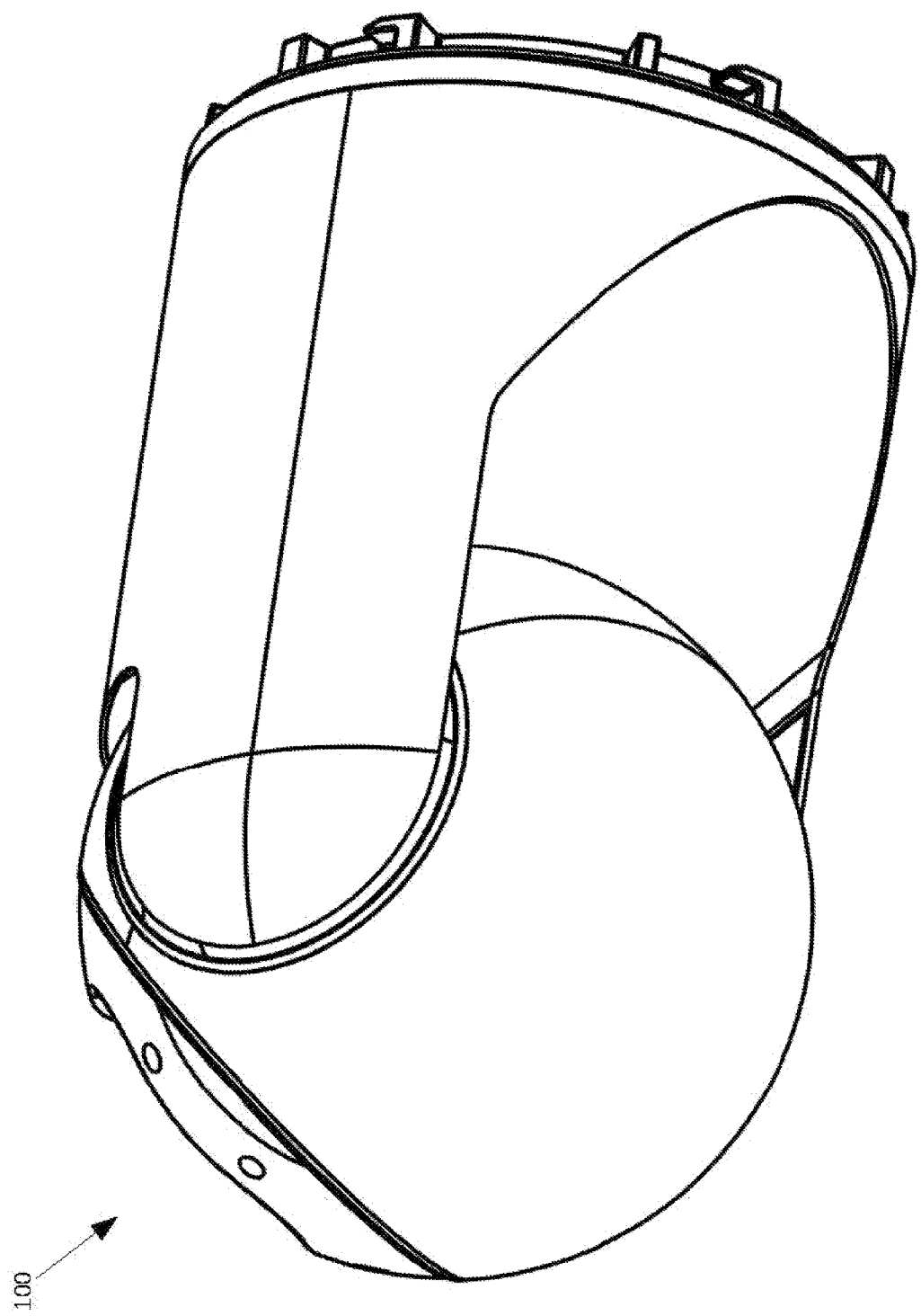
FIG. 26 illustrates a gimbal stabilized camera according to FIG. 1.

As illustrated in FIG. 24, FIG. 25, and FIG. 26, the combination of three rotational stages composed in a similar way (though individually tailored to the particular mechanical and robotic requirements of each stage), allows for a flexible and articulate system that is configured to and able to rotate the multiple sensor 304, or the single sensor 305 through many poses on the end of the third rotational stage 303 of the gimbal 100. FIG. 26 in particular shows the way the end effector may be configured to point above the horizon of the gimbal 100. Furthermore, the ability for the third rotational stage 303 to rotate continuously may allow for the multiple sensor 304, or the single sensor 305 to point and stare at an object without encountering gimbal lock.

Mechanical Design

Figure 28:
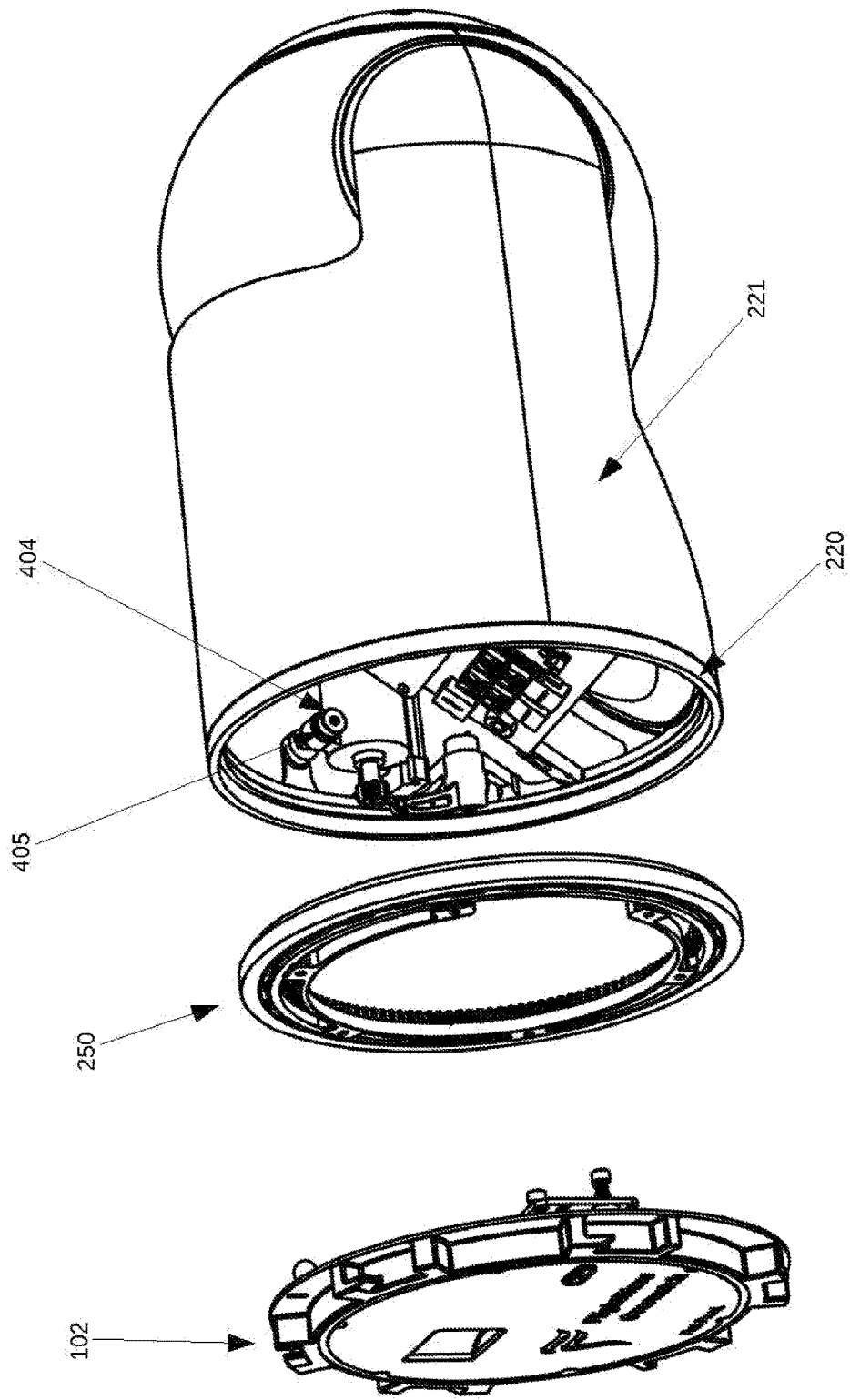
FIG. 28 illustrates a gimbal stabilized camera according to FIG. 1.
Figure 29:
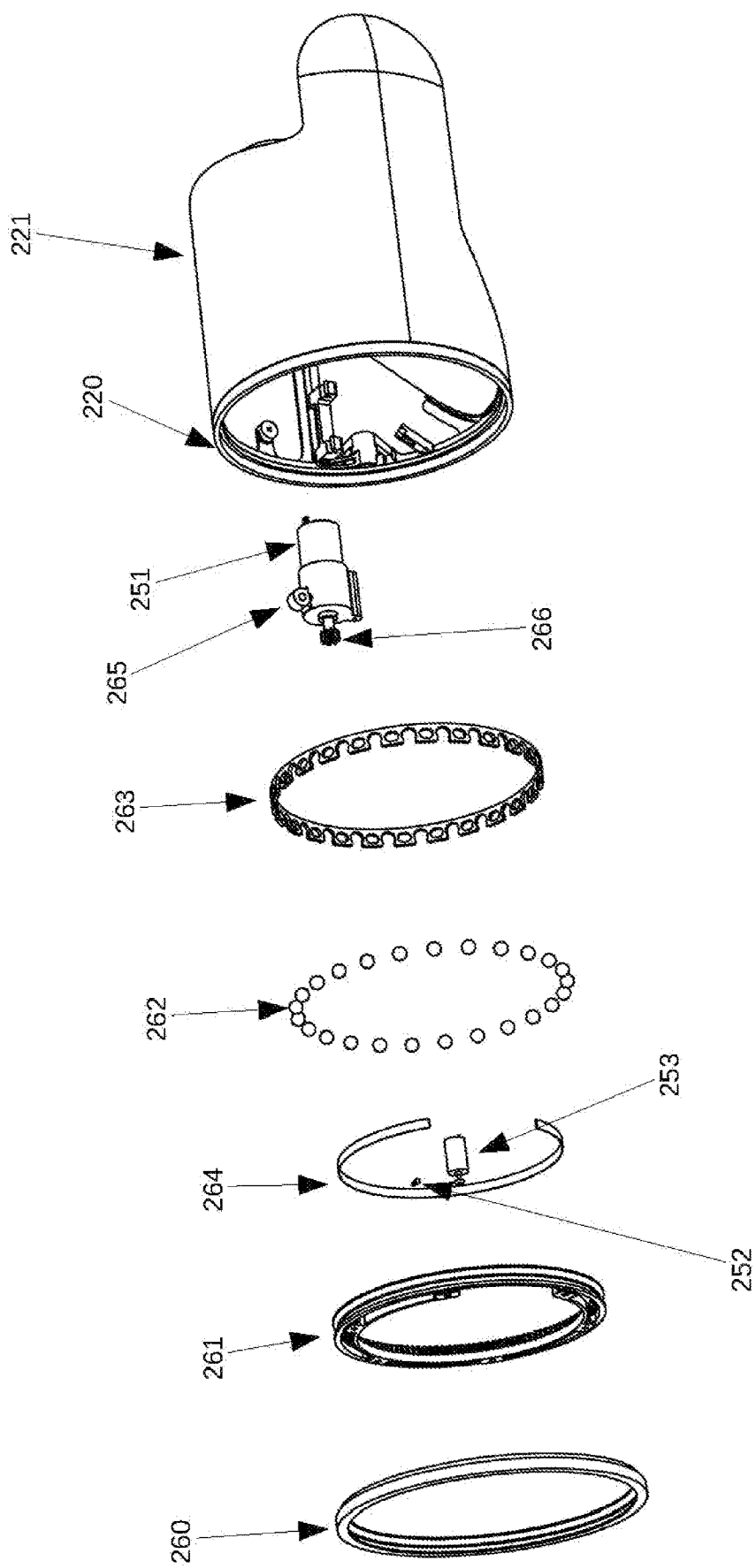
FIG. 29 illustrates a gimbal stabilized camera according to FIG. 1.

As illustrated in FIG. 28 and FIG. 29, the rotational stages may be constructed using an integrated bearing, gear, and sensing component 250, a motor 251, a position sensor pin 252, and a velocity sensor device 253. Further the integrated bearing, gear, and sensing component 250 as illustrated in the exploded view of FIG. 29 shows that the integrated bearing, gear, and sensing component 250 may include a bearing track 260, a bearing track with integrated gears 261, ball bearings 262, a bearing cage 263, and a position sensing strip 264. The integrated bearing, gear, and sensing component 250 may be assembled separately and then may be bonded to the internal structure 220 of each stage of the gimbal 100. The combination of the bearing track 260, the bearing track with the integrated gears 261, the ball bearings 262, and the bearing cage 263 may be configured to allow for low friction rotation of each stage. The shape profile of the tracks on the bearing track 260 and the bearing track with the integrated gears 261 may be configured to be responsible for both axial and radial load on each stage. With respect to the position sensor pin 252 and the velocity sensor device 253, both can be configured to run on an outer diameter of the respective stage. Both the position sensor pin 252 and the velocity sensor device 253 may run on the same surface. Alternatively, in the second rotational stage 302, for example, the position sensor pin 252 and the velocity sensor device 253 can be configured to run on different surfaces. The position sensor pin 252 may be spring loaded to maintain connection with the position sensing strip 264 under vibration environments. Additionally, the velocity sensor device 253 may be spring loaded to maintain connection with the corresponding surface under vibration environments. Furthermore, the motor 251 can be spring loaded and fastened to the internal structure 220 with a motor housing 265. A motor screw 404 and a motor spring 405 can accomplish this, and can allow for a slop free gear mesh between a gear 266 and the bearing track with the integrated gears 261. Each stage can house its own implementation of the motor 251 and configured to be driven independently. The gear 266 may be attached to the motor 251 and mate with the bearing track with the integrated gears 261.

The integrated bearing, gear, and sensing component 250 may be configured to allow for large diameter integrated gear implementations of the integrated gears 261 in a small space, which may increase the gear ratio and allow for a lower torque. In this regard, the lower torque may allow for a lighter and/or smaller implementation of the motor 251 and smaller motor gear implementation of the gear 266. This in turn may transfer power from the motor 251 to the bearing track with the integrated gears 261 to drive the stage.

The integrated bearing, gear, and sensing component 250 may also allow for the motor 251 to sit on the outer edge of the respective stages. This may allow for space inside each stage of the gimbal 100 for other components, such as the one or more computers 110, wiring, and the sensors 304 and/or the single sensor 305. Note, the bearing track with the integrated gears 261 and the bearing track 260 can be fastened to separate stages of the gimbal 100 allowing the stages to rotate freely through the ball bearings 262.

Figure 27:
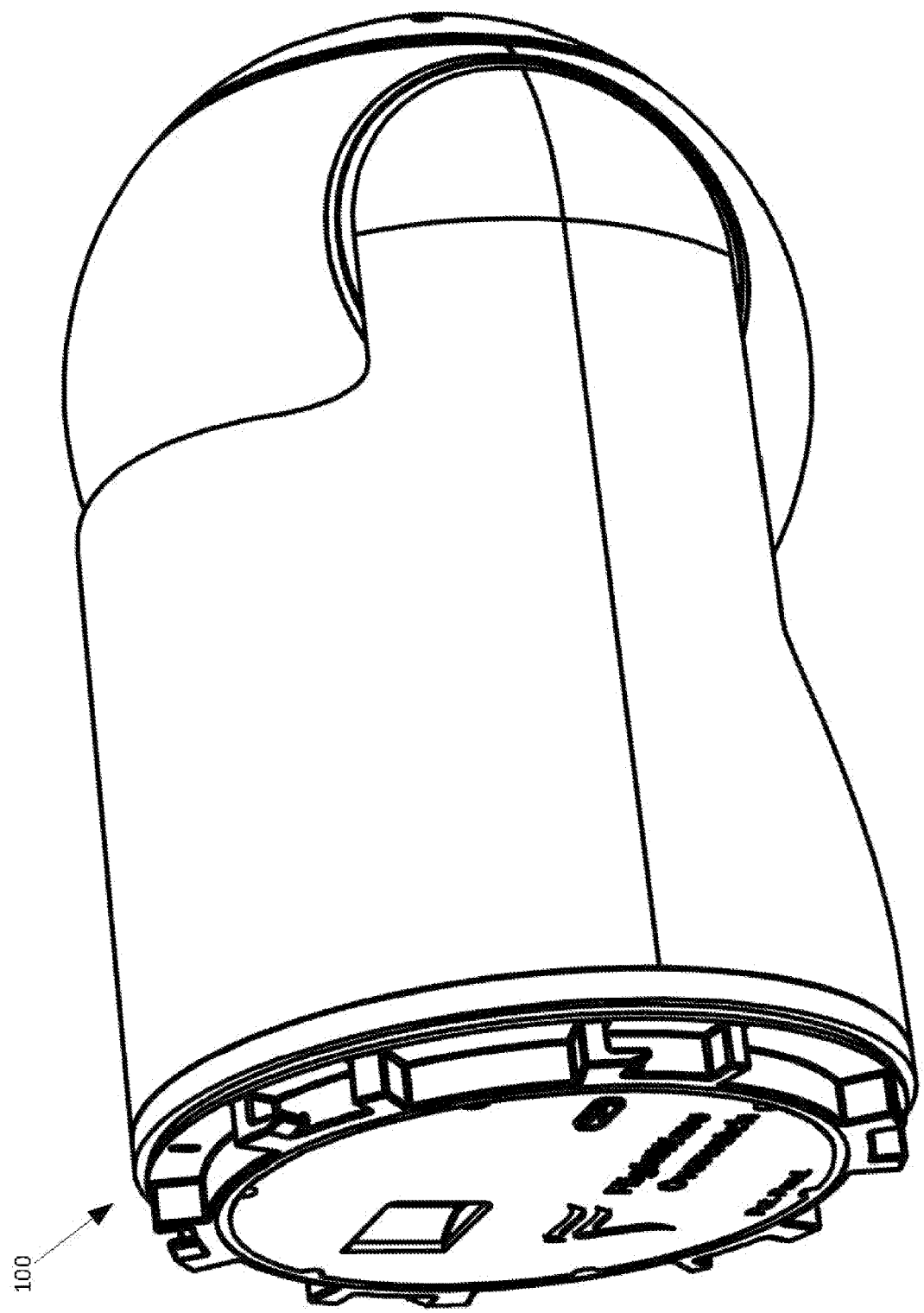
FIG. 27 illustrates a gimbal stabilized camera according to FIG. 1.

FIG. 27, FIG. 28, and FIG. 29 illustrate the features of the first rotational stage 301. The first rotational stage 301 may be responsible for the first roll stage. More specifically, the integrated bearing, gear, and sensing component 250 may be bonded to the internal structure 220 and fastened to the payload wall 102 to allow for the rotation of the first rotational stage 301 on the payload wall 102. The first rotational stage 301 may also house the one or more computers 110, one or more implementations of the motor 251, and/or the like. The first rotational stage 301 can be configured with and responsible for implementing the heat sink 223 to dissipate heat from the one or more computers 110 to the outside air through the composite skin 221.

Figure 30:
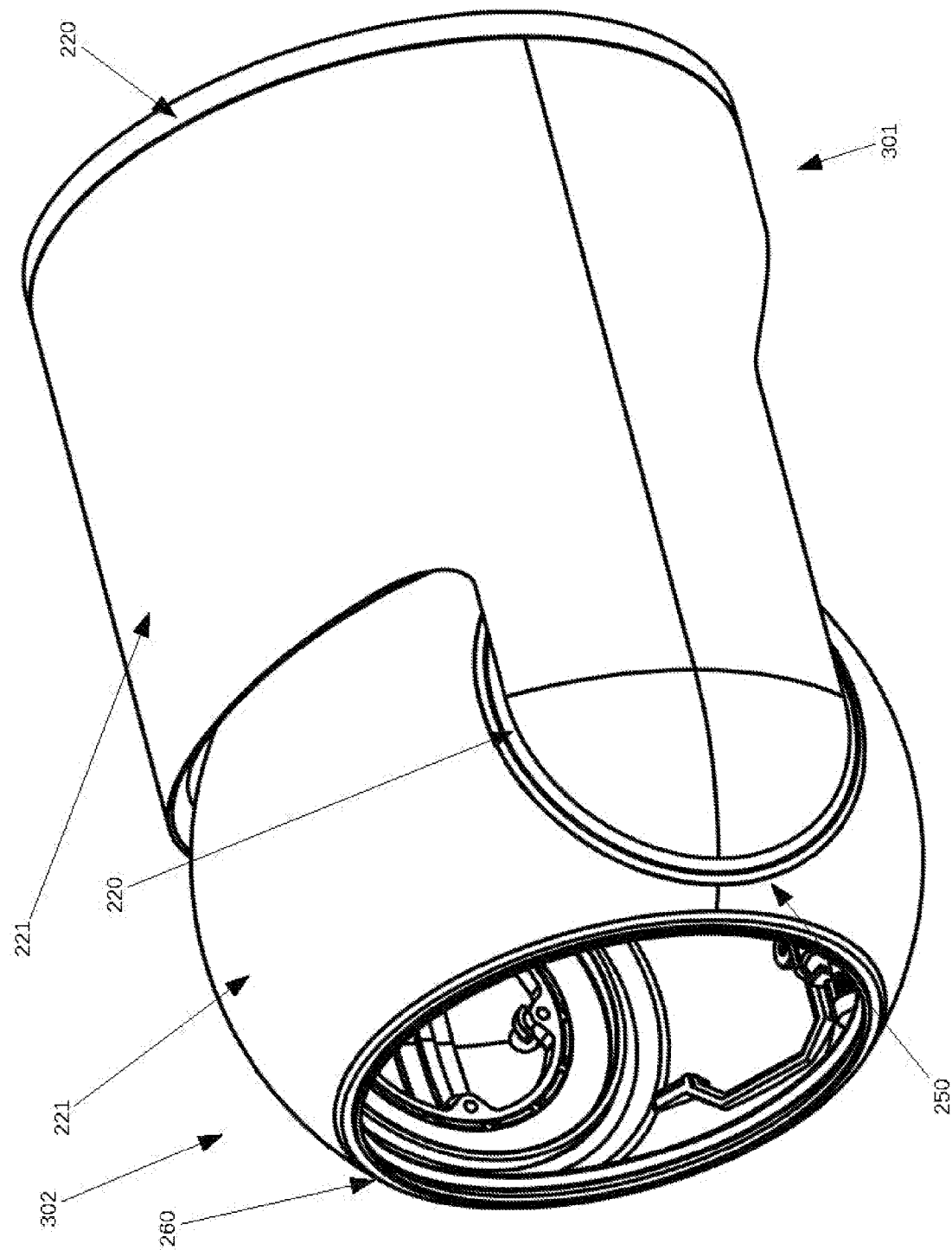
FIG. 30 illustrates a gimbal stabilized camera according to FIG. 1.
Figure 31:
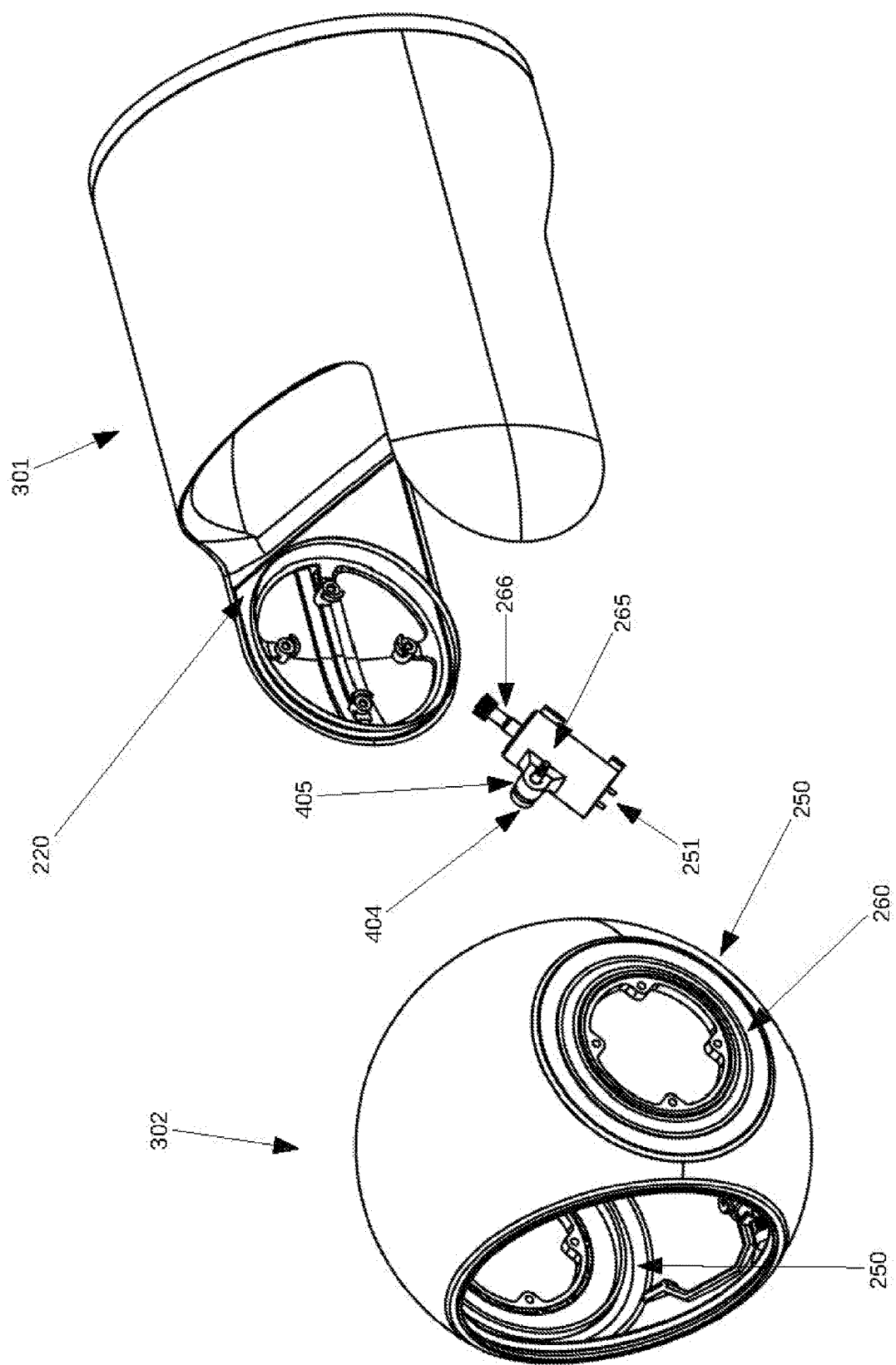
FIG. 31 illustrates a gimbal stabilized camera according to FIG. 1.
Figure 32:
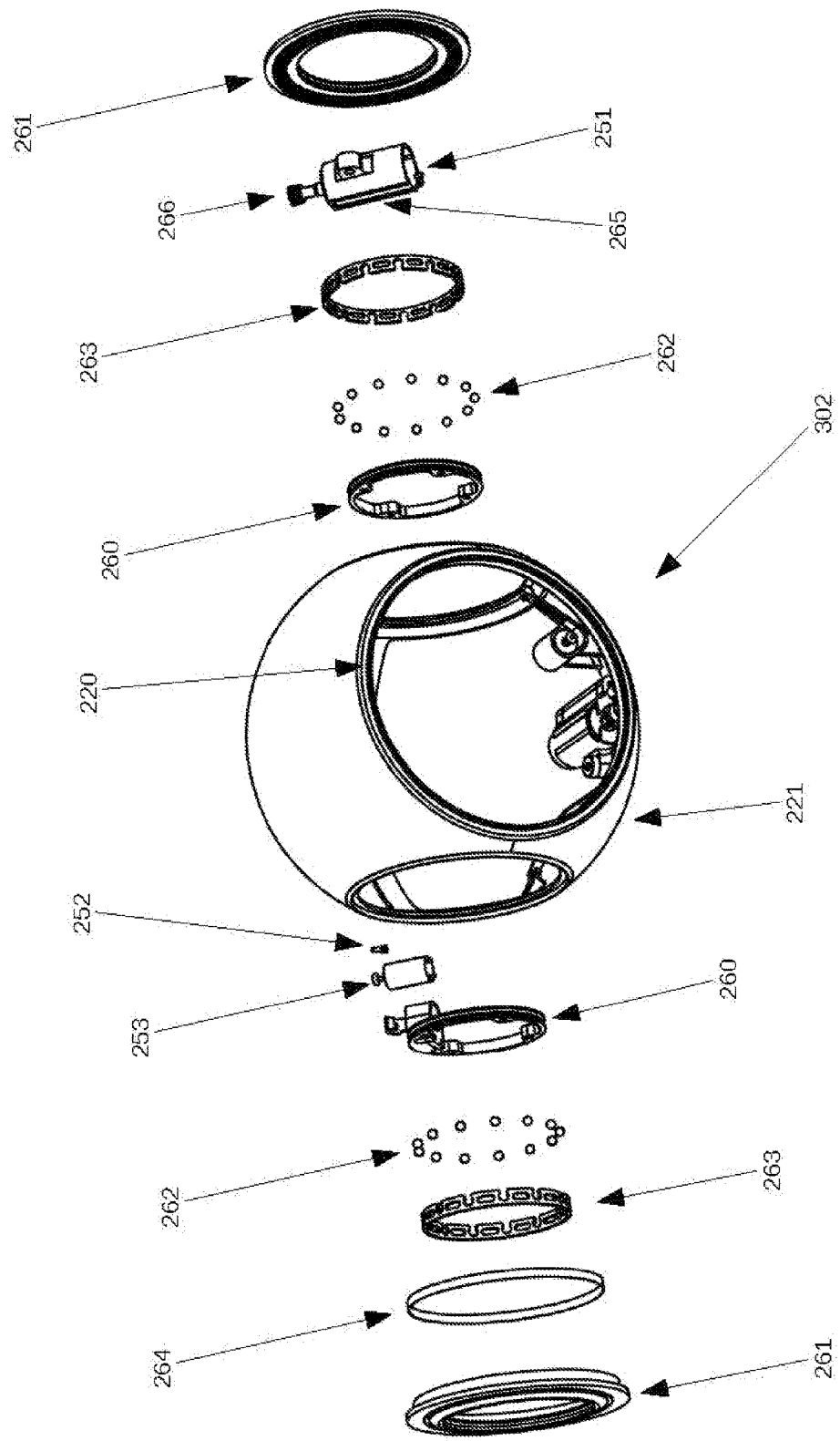
FIG. 32 illustrates a gimbal stabilized camera according to FIG. 1.

FIG. 30, FIG. 31, and FIG. 32 illustrate the features of the second rotational stage 302. The second rotational stage 302 may be configured to be responsible for pitch. Note the way the second rotational stage 302 may be constructed using two implementations of the integrated bearing, gear, and sensing component 250 systems on each side the second rotational stage 302. The position sensor pin 252, the position sensing strip 264, and the velocity sensor device 253 may be installed on the opposite side to the bearing track 260, the bearing track with integrated gears 261, and the motor 251.

Figure 33:
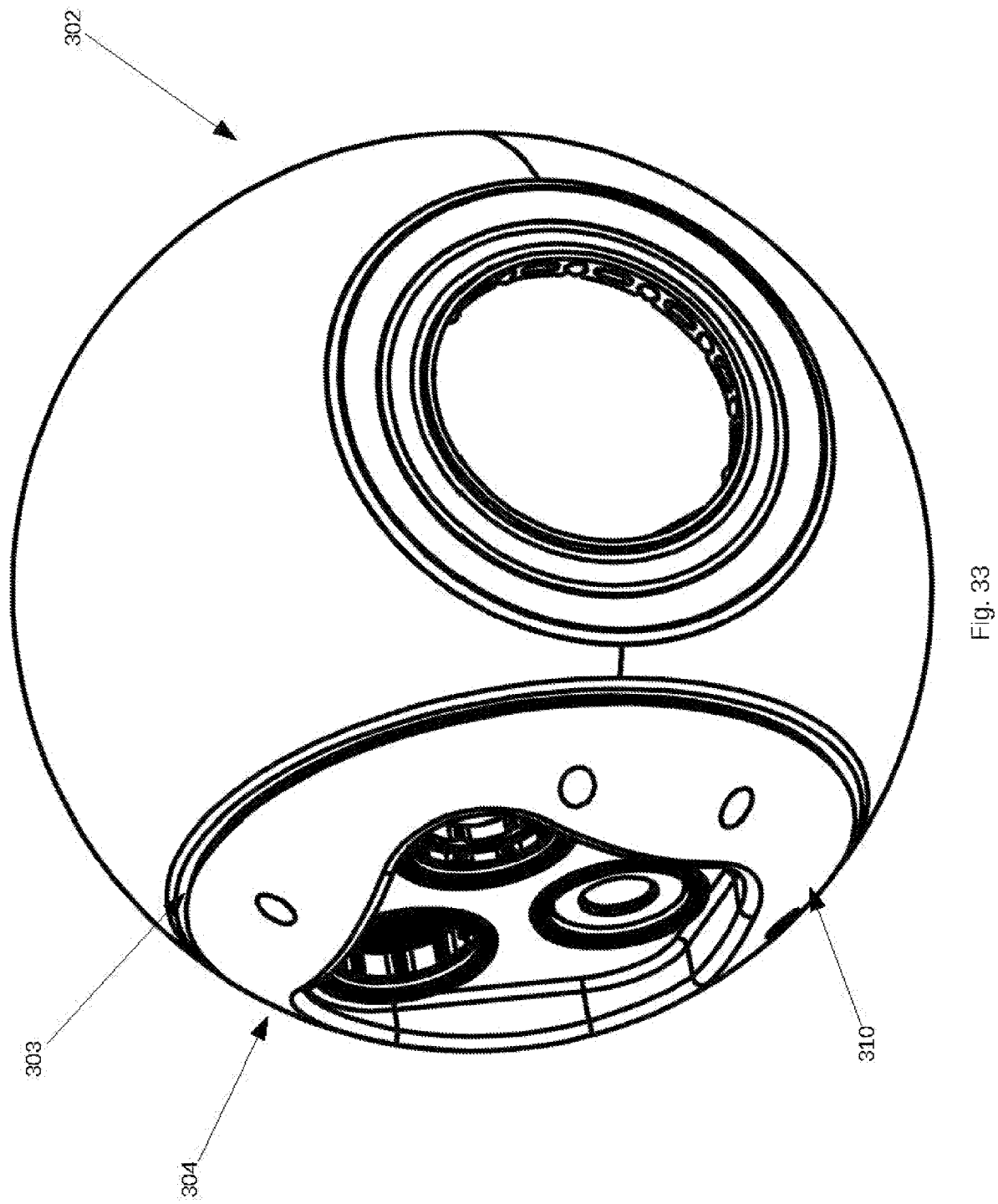
FIG. 33 illustrates a gimbal stabilized camera according to FIG. 1.
Figure 34:
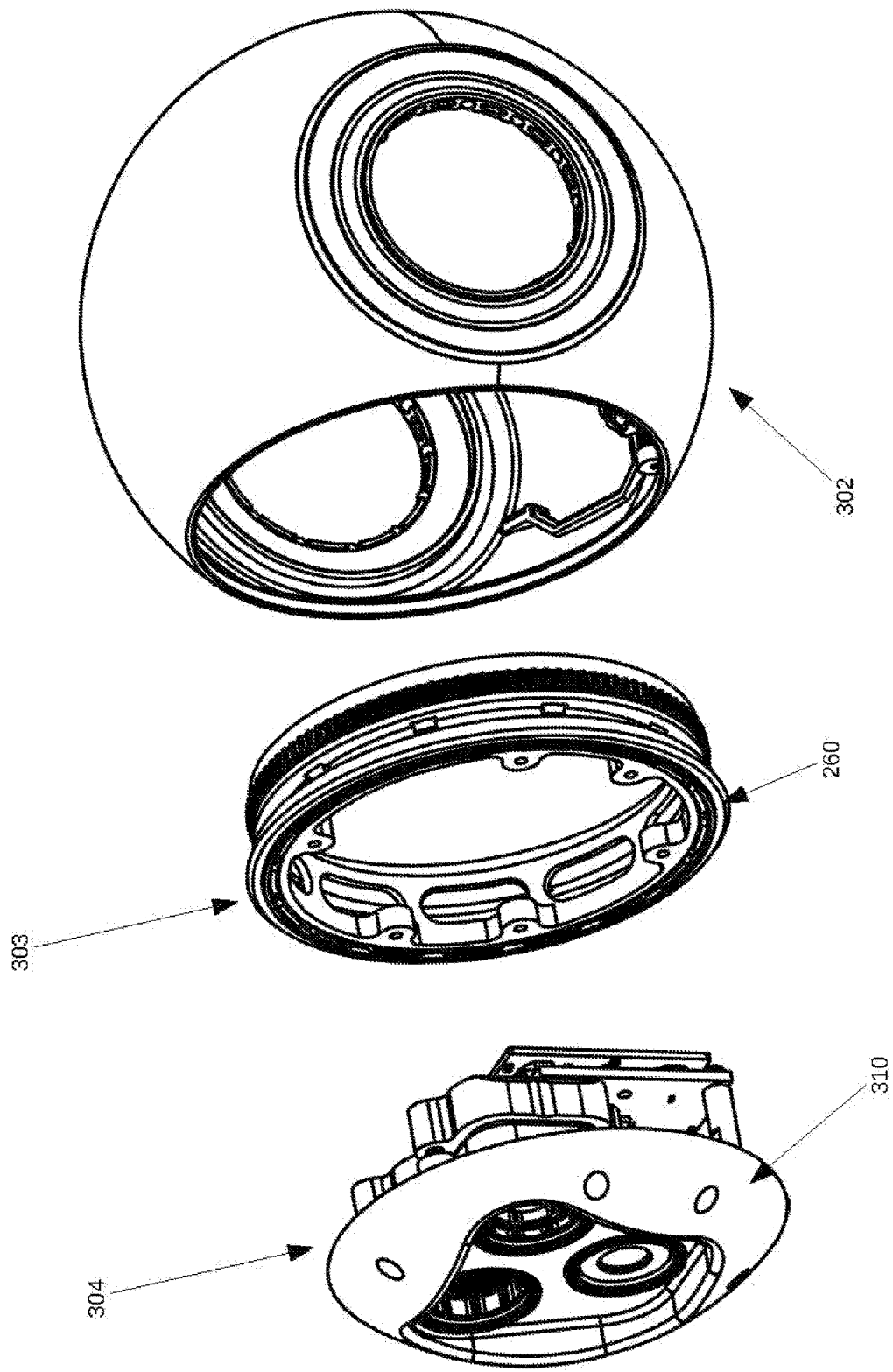
FIG. 34 illustrates a gimbal stabilized camera according to FIG. 1.

FIG. 33, FIG. 34, and FIG. 35 illustrate features of the third rotational stage 303. The third rotational stage 303 can be configured to be responsible for the final roll stage. The third rotational stage 303 may be bonded to the internal structure 220 and fastened to the multiple sensor 304 or the single sensor 305. The third rotational stage 303 may be configured to allow for the rotation of the multiple sensor 304 or the single sensor 305. The third rotational stage 303 may be configured to have the ability to rotate continuously. The third rotational stage 303 can also be configured to be responsible for housing the motor 251 as well as the position sensor pin 252 and the velocity sensor device 253.

Accordingly, one or more of the first rotational stage 301, the second rotational stage 302, and the third rotational stage 303 may include an implementation of the velocity sensor device 253. In aspects, each of the first rotational stage 301, the second rotational stage 302, and the third rotational stage 303 may include an implementation of the velocity sensor device 253. In aspects, each implementation of the velocity sensor device 253 may provide sensor information to the one or more computers 110. Additionally, one or more of the first rotational stage 301, the second rotational stage 302, and the third rotational stage 303 may include an implementation of the motor 251. In aspects, each of the first rotational stage 301, the second rotational stage 302, and the third rotational stage 303 may include an implementation of the motor 251. In further aspects, each implementation of the motor 251 may be controlled by the one or more computers 110 responsive to a respective implementation of the velocity sensor device 253.

Sealing

The total sealing strategy of the payload is an important system consideration of the gimbal 100 that is reiterated here. In the presented embodiment of the gimbal 100, there are four general intrusion areas that are addressed by the design and configuration of the gimbal 100 to enable a fully water-sealed and dust-sealed embodiment. The first sealing area is the overall casing of a nosecone of the gimbal 100, which as shown in FIG. 14 and FIG. 13, may be provided by and configured with a non-porous implementation of the composite skins 221. Additionally, the first sealing area may be sealed via bonding to the internal structure 220 with an impermeable sealing material.

Figure 12:
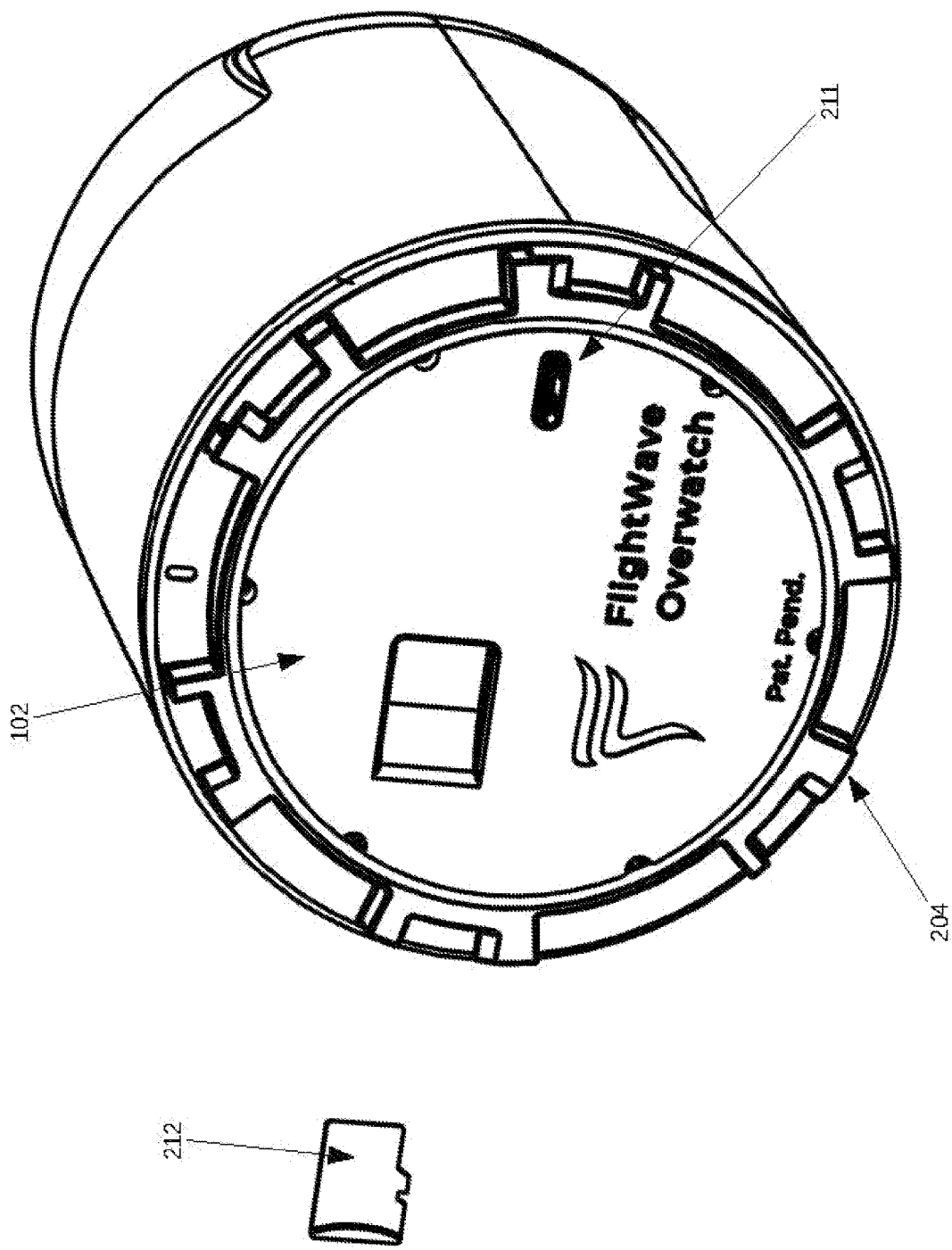
FIG. 12 illustrates a gimbal stabilized camera according to FIG. 1.

The second sealing area addresses the open interfaces at a back of the payload wall 102, for example data cards, the memory card 212, the electrical connections 211, and/or the like, which as shown in FIG. 8, FIG. 9, and FIG. 12, may be addressed by and configured by using the seal 401. In aspects, the seal 401 may be implemented as a sealing O-ring that is retained in a groove 243, and seals against a front fuselage wall 1011 of the UAS 1010. The seal 401 may be implemented such that it is the only seal that is routinely openable, as the seal 401 only seals when the gimbal 100 is mounted onto the UAS 1010. However this is acceptable in practice as there is not a practical need to seal all of the payload when the gimbal 100 is not being flown on the UAS 1010.

The third general intrusion area is the joint between the rotating stages of the gimbal 100. The seal for the third general intrusion area may be addressed by the use of grease, an O-ring, or both to seal between a stationary surface and a moving surface between the rotating stages of the gimbal 100. For example, on the first rotational stage 301, the surface of the bearing track 260 meets the wall of the payload wall 102, as shown in FIG. 27 and FIG. 28. An O-ring, grease, or both may be placed between the interfacing walls to seal the surfaces. On the second rotational stage 302, FIG. 30 and FIG. 31 show the mating surfaces between the bearing track 260 and the internal structure 220. The third rotational stage 303 may have the mating surface between the bearing track 260 and the multiple sensor housing 310, or the single sensor implementation of the sensor housing 311. This can be seen in FIG. 33 and FIG. 34. The fourth potential intrusion areas are the bonding surfaces between the bearing track 260 and the internal structure 220. This seal is managed by using a non-porous bonding material, for example room-temperature vulcanizing rubber, to close any small gaps that may occur between the bearing tracks 260 and the internal structure 220 on any of the stages of the gimbal 100. These sealing joints can be seen in FIG. 30.

In aspects, the multiple sensor 304 and/or the single sensor 305 may be implemented with at least one color camera configured with a variable focal length and/or a variable zoom. In aspects, the integrated bearing, gear, and sensing component 250 may be implemented as a system having rotational angle feedback implemented with an angle sensor implementation of the velocity sensor device 253.

In aspects, the gimbal 100 may be configured together with the one or more computers 110 for controlling a motion of the gimbal 100 utilizing rotational control computers. In aspects, the gimbal 100 is constructed with a bonded composite structure. The bonded composite structure may include the composite skins 221 implemented as one or more thin-wall composite skins constructed of bonded fabric, metal or synthetic material; and the bonded composite structure may include the internal structure 220 implemented as one or more internal composing structures configured to hold the one or more thin-wall composite skins. In aspects, the gimbal 100 is configured to limit penetration by water and/or small particles.

Accordingly, the disclosure has set forth a gimbal stabilized camera that is able to reject motion disturbances as well as be controlled manually and autonomously, which provides a smooth stable video to the user either in real time if transmitted wirelessly to the ground, or at a later time when stored to an on-board storage medium. Additionally, the disclosure set forth a stabilized camera for a UAV and/or UAS that is further lightweight and environmentally hardened.

The following are a number of nonlimiting EXAMPLES of aspects of the disclosure. One EXAMPLE includes: EXAMPLE 1. A gimbal configured to be implemented an unmanned aerial system, the gimbal includes: a payload interface configured for tool-free mechanical attachment to an unmanned aerial system; the payload interface further configured with electrical connections configured to receive power from the unmanned aerial system; the payload interface further configured with electrical connections configured to exchange data with the unmanned aerial system; an end effector configured to hold at least one sensor in a stabilized orientation; a structure includes composite skins, an internal structure, and integrated seals; integrated drive components with gearing and bearings arranged on outermost diameter of rotation interfaces with one, two or three rotational degrees of freedom; and at least one computer that includes at least one of the following: a dedicated vision computer, a dedicated targeting computer, and/or one or more rotational actuator control computers, where excess heat generated by the at least one computer is disposed of through a heat transfer surface integrated into the composite skin of the gimbal.

The above-noted EXAMPLE may further include any one or a combination of more than one of the following EXAMPLES: 2. The gimbal according to Any EXAMPLE herein, includes: a first stage configured as a "roll" stage; a second stage configured as a "pitch" stage; and a third stage configured as another "roll" stage, where the first stage, the second stage, and the third stage are configured with rotational degrees of freedom. 3. The gimbal according to any EXAMPLE herein where the third stage is configured to continuously rotate. 4. The gimbal according to Any EXAMPLE herein includes a heat sink thermally coupled to the at least one computer. 5. The gimbal according to Any EXAMPLE herein, where the sensor includes a single color camera. 6. The gimbal according to Any EXAMPLE herein, where the sensor includes one color camera of fixed focal length and one thermal camera of fixed focal length. 7. The gimbal according to Any EXAMPLE herein, where the sensor includes one color camera configured with a variable focal length and/or a variable zoom. 8. The gimbal according to Any EXAMPLE herein, includes a system configured to provide rotational angle feedback implemented with an angle sensor. 9. The gimbal according to Any EXAMPLE herein, includes at least one rotational control computer configured to control a motion of the gimbal to have multiple rotational degrees of freedom. 10. The gimbal according to Any EXAMPLE herein, includes: a payload interface wall; and a removable data storage arranged in the payload interface wall. 11. The gimbal according to Any EXAMPLE herein, where the payload interface is configured to be attached to the unmanned aerial system at a front of an aircraft. 12. The gimbal according to Any EXAMPLE herein, includes seals configured to limit penetration by water and/or small particles. 13. The gimbal according to Any EXAMPLE herein, includes: at least one stage configured with a bonded composite structure, where the bonded composite structure includes one or more thin-wall composite skins constructed of bonded fabric, metal or synthetic material; and where the bonded composite structure further includes one or more internal composing structures configured to hold the one or more thin-wall composite skins.

One EXAMPLE includes: EXAMPLE 14. A process of implementing a lightweight stabilized attachment to an unmanned aerial system, the process of implementing a lightweight stabilized attachment to an unmanned aerial system includes: implementing a gimbal; configuring a payload interface of the gimbal for tool-free mechanical attachment to an unmanned aerial system; configuring the payload interface of the gimbal for electrical connections to receive power from the unmanned aerial system; configuring the payload interface of the gimbal for electrical connections to exchange data with the unmanned aerial system; configuring the gimbal with one, two or three rotational degrees of freedom; configuring an end effector of the gimbal to hold at least one sensor in a stabilized orientation; constructing the gimbal with composite skins and internal structure; constructing the gimbal with integrated seals and bearings in an outermost diameter of rotational interfaces; implementing integrated drive components with gearing arranged on outermost diameter of rotation interfaces; and implementing at least one computer that includes at least one of the following: a dedicated vision computer, a dedicated targeting computer, and/or one or more rotational actuator control computers, where excess heat generated by the at least one computer is disposed of through a heat transfer surface integrated into the composite skin of the gimbal.

The above-noted EXAMPLE may further include any one or a combination of more than one of the following EXAMPLES: any EXAMPLE herein 15. The process of implementing a lightweight stabilized attachment to an unmanned aerial system according to Any EXAMPLE herein, includes: implementing a first stage configured as a "roll" stage; implementing a second stage configured as a "pitch" stage; and implementing a third stage configured as another "roll" stage, where the first stage, the second stage, and the third stage are configured with rotational degrees of freedom. 16. The process of implementing a lightweight stabilized attachment to an unmanned aerial system according to any EXAMPLE herein where the third stage is configured to continuously rotate. 17. The process according to Any EXAMPLE herein, includes thermally coupling a heat sink to the at least one computer. 18. The process of implementing a lightweight stabilized attachment to an unmanned aerial system according to Any EXAMPLE herein, where the sensor includes a single color camera. 19. The process of implementing a lightweight stabilized attachment to an unmanned aerial system according to Any EXAMPLE herein, where the sensor includes one color camera of fixed focal length and one thermal camera of fixed focal length. 20. The process of implementing a lightweight stabilized attachment to an unmanned aerial system according to Any EXAMPLE herein, where the sensor includes one color camera configured with a variable focal length and/or a variable zoom. 21. The process of implementing a lightweight stabilized attachment to an unmanned aerial system according to Any EXAMPLE herein, includes implementing a system of rotational angle feedback implemented with an angle sensor. 22. The process of implementing a lightweight stabilized attachment to an unmanned aerial system according to Any EXAMPLE herein, includes controlling a motion of the gimbal to have multiple rotational degrees of freedom utilizing at least one rotational control computer. 23. The process of implementing a lightweight stabilized attachment to an unmanned aerial system according to Any EXAMPLE herein, includes: implementing a payload interface wall; and implementing a removable data storage in the payload interface wall. 24. The process of implementing a lightweight stabilized attachment to an unmanned aerial system according to Any EXAMPLE herein, includes configuring the gimbal to attach to an unmanned aerial system at a front of an aircraft. 25. The process of implementing a lightweight stabilized attachment to an unmanned aerial system according to Any EXAMPLE herein, includes implementing the gimbal with seals configured to limit penetration by water and/or small particles. 26. The process of implementing a lightweight stabilized attachment to an unmanned aerial system according to Any EXAMPLE herein, includes: constructing at least one stage of the gimbal as a bonded composite structure, where the bonded composite structure includes one or more thin-wall composite skins constructed of bonded fabric, metal or synthetic material; and, where the bonded composite structure further includes one or more internal composing structures configured to hold the one or more thin-wall composite skins.

One EXAMPLE includes: EXAMPLE 27. A method of constructing a lightweight stabilized camera gimbal for attachment to an unmanned aerial system with a payload interface includes: configuring a payload interface for: tool-free mechanical retention, electrical connections for power, and electrical connections for data; configuring a payload interface with one, two or three rotational degrees of freedom; configuring an end effector that holds at least one sensor in a stabilized orientation; constructing using composite skins and internal structure; constructing using integrated seals and bearings in an outermost diameter of the rotational interfaces; constructing using integrated drive components such as gearing to the outermost diameter of rotation interfaces; and implementing at least one computer that includes: a dedicated vision computer, a dedicated targeting computer, and one or more rotational actuator control computers, where excess heat generated by one or more of the computers are disposed of through a heat transfer surface integrated into the skin of the stabilized camera gimbal.

The above-noted EXAMPLE may further include any one or a combination of more than one of the following EXAMPLES: any EXAMPLE herein 28. The method according to Any EXAMPLE herein, where the stabilized camera gimbal is configured with rotational degrees of freedom that are organized as first a "roll" stage, second a "pitch" stage, and third another "roll" stage. 29. The method according to any EXAMPLE herein where the third stage is able to continuously rotate. 30. The method according to Any EXAMPLE herein, where the sensors include a single color camera. 31. The method according to Any EXAMPLE herein, where the sensors include one color camera of fixed focal length and one thermal camera of fixed focal length. 32. The method according to Any EXAMPLE herein, where the sensors include one color camera of variable focal length/zoom. 33. The method according to Any EXAMPLE herein, where a system of rotational angle feedback is provided through an angle sensor. 34. The method according to Any EXAMPLE herein, where motion of the rotational degrees of freedom are controlled by rotational control computers. 35. The method according to Any EXAMPLE herein, where methods for removable data storage (cfexpress, microsd, sd card) are provided at a payload interface wall. 36. The method according to Any EXAMPLE herein, where the gimbal attaches to an unmanned aerial system at the front of the aircraft. 37. The method according to Any EXAMPLE herein, where the gimbal with seals is constructed to be impervious to penetration by water and/or small particles like sand or dust. 38. The method according to Any EXAMPLE herein, where at least one stage of the gimbal is constructed of a bonded composite structure, includes: one or more thin-wall composite skins, constructed of bonded fabric, metal or other material; and one or more internal composing structures that hold the skins.

One EXAMPLE includes: EXAMPLE 39. A method of controlling a stabilized camera gimbal includes at least one computer, includes: implementing the at least one computer with a computer vision function, implementing the at least one computer with a target pointing function, and implementing the at least one computer with one or more rotational actuator control functions, where excess heat generated by the at least one computer is disposed of through a heat transfer surface integrated into a skin of the stabilized camera gimbal.

One EXAMPLE includes: EXAMPLE 40. A lightweight stabilized camera gimbal for attachment to an unmanned aerial system with a payload interface includes: a payload interface configured for: tool-free mechanical retention, electrical connections for power, and electrical connections for data; a payload interface configured with one, two or three rotational degrees of freedom; an end effector configured to hold at least one, sensor in a stabilized orientation; composite skins and internal structure; integrated seals and bearings in an outermost diameter of rotational interfaces; integrated drive components such as gearing to the outermost diameter of rotation interfaces; and at least one computer that implements: a computer vision function, a target pointing function, and one or more rotational actuator control functions, where excess heat generated by the at least one computer is disposed of through a heat transfer surface integrated into the skin of the stabilized camera gimbal.

The above-noted EXAMPLE may further include any one or a combination of more than one of the following EXAMPLES: any EXAMPLE herein 41. The lightweight stabilized camera gimbal according to Any EXAMPLE herein, where the stabilized camera gimbal is configured with rotational degrees of freedom that are organized as first a "roll" stage, second a "pitch" stage, and third another "roll" stage. 42. The lightweight stabilized camera gimbal according to any EXAMPLE herein where the third stage is able to continuously rotate. 43. The lightweight stabilized camera gimbal according to Any EXAMPLE herein, where the sensors include a single color camera. 44. The lightweight stabilized camera gimbal according to Any EXAMPLE herein, where the sensors include one color camera of fixed focal length and one thermal camera of fixed focal length. 45. The lightweight stabilized camera gimbal according to Any EXAMPLE herein, where the sensors include one color camera of variable focal length/zoom. 46. The lightweight stabilized camera gimbal according to Any EXAMPLE herein, where a system of rotational angle feedback is provided through an angle sensor. 47. The lightweight stabilized camera gimbal according to Any EXAMPLE herein, where motion of the rotational degrees of freedom are controlled by rotational control computers. 48. The lightweight stabilized camera gimbal according to Any EXAMPLE herein, where a removable data storage (cfexpress, microsd, sd card) is provided at a payload interface wall. 49. The lightweight stabilized camera gimbal according to Any EXAMPLE herein, where the gimbal is configured to attach to an unmanned aerial system at a front of an aircraft. 50. The lightweight stabilized camera gimbal according to Any EXAMPLE herein, where the gimbal is configured with seals constructed to be impervious to penetration by water and/or small particles like sand or dust. 51. The lightweight stabilized camera gimbal according to Any EXAMPLE herein, where at least one stage of the gimbal is constructed of a bonded composite structure, includes: one or more thin-wall composite skins, constructed of bonded fabric, metal or other material; and one or more internal composing structures that hold the skins.

One EXAMPLE includes: EXAMPLE 52. A stabilized camera gimbal includes at least one computer, includes: a dedicated vision computer, a dedicated targeting computer, and one or more rotational actuator control computers, where excess heat generated by one or more of the computers are disposed of through a heat transfer surface integrated into a skin of the stabilized camera gimbal.

One EXAMPLE includes: EXAMPLE 53. A method of constructing a lightweight stabilized camera gimbal for attachment to an unmanned aerial system with a payload interface includes: configuring a payload interface for: tool-free mechanical retention, electrical connections for power, and electrical connections for data; configuring a payload interface with one, two or three rotational degrees of freedom; configuring an end effector that holds at least one sensor in a stabilized orientation; constructing using composite skins and internal structure; constructing using integrated seals and bearings in an outermost diameter of the rotational interfaces; constructing using integrated drive components such as gearing to the outermost diameter of rotation interfaces; and implementing at least one computer that includes: a dedicated vision computer, a dedicated targeting computer, and one or more rotational actuator control computers, where excess heat generated by one or more of the computers are disposed of through a heat transfer surface integrated into the skin of the stabilized camera gimbal.

The above-noted EXAMPLE may further include any one or a combination of more than one of the following EXAMPLES: any EXAMPLE herein 54. The method according to Any EXAMPLE herein, where the stabilized camera gimbal is configured with rotational degrees of freedom that are organized as first a "roll" stage, second a "pitch" stage, and third another "roll" stage. 55. The method according to any EXAMPLE herein where the third stage is able to continuously rotate. 56. The method according to Any EXAMPLE herein, where the sensors include a single color camera. 57. The method according to Any EXAMPLE herein, where the sensors include one color camera of fixed focal length and one thermal camera of fixed focal length. 58. The method according to Any EXAMPLE herein, where the sensors include one color camera of variable focal length/zoom. 59. The method according to Any EXAMPLE herein, where a system of rotational angle feedback is provided through an angle sensor. 60. The method according to Any EXAMPLE herein, where motion of the rotational degrees of freedom are controlled by rotational control computers. 61. The method according to Any EXAMPLE herein, where methods for removable data storage (cfexpress, microsd, sd card) are provided at a payload interface wall. 62. The method according to Any EXAMPLE herein, where the gimbal attaches to an unmanned aerial system at a front of an aircraft. 63. The method according to Any EXAMPLE herein, where the gimbal with seals is constructed to be impervious to penetration by water and/or small particles like sand or dust. 64. The method according to Any EXAMPLE herein, where at least one stage of the gimbal is constructed of a bonded composite structure, includes: one or more thin-wall composite skins, constructed of bonded fabric, metal or other material; and one or more internal composing structures that hold the skins.

One EXAMPLE includes: EXAMPLE 65. A method of controlling a stabilized camera gimbal includes at least one computer, includes: implementing a computer vision function, implementing a target pointing function, and implementing one or more rotational actuator control functions, where excess heat generated by one or more of the computers are disposed of through a heat transfer surface integrated into a skin of the stabilized camera gimbal.

One EXAMPLE includes: EXAMPLE 66. A lightweight stabilized camera gimbal for attachment to an unmanned aerial system with a payload interface includes: a payload interface configured for: tool-free mechanical retention, electrical connections for power, and electrical connections for data; a payload interface configured with one, two or three rotational degrees of freedom; an end effector configured to hold at least one sensor in a stabilized orientation; composite skins and internal structure; integrated seals and bearings in an outermost diameter of rotational interfaces; integrated drive components such as gearing to the outermost diameter of rotation interfaces; and at least one computer that implements: a computer vision function, a target pointing function, and one or more rotational actuator control functions, where excess heat generated by one or more of the computers are disposed of through a heat transfer surface integrated into the skin of the stabilized camera gimbal.

The above-noted EXAMPLE may further include any one or a combination of more than one of the following EXAMPLES: any EXAMPLE herein 67. The lightweight stabilized camera gimbal according to Any EXAMPLE herein, where the stabilized camera gimbal is configured with rotational degrees of freedom that are organized as first a "roll" stage, second a "pitch" stage, and third another "roll" stage. 68. The lightweight stabilized camera gimbal according to any EXAMPLE herein where the third stage is able to continuously rotate. 69. The lightweight stabilized camera gimbal according to Any EXAMPLE herein, where the sensors include a single color camera. 70. The lightweight stabilized camera gimbal according to Any EXAMPLE herein, where the sensors include one color camera of fixed focal length and one thermal camera of fixed focal length. 71. The lightweight stabilized camera gimbal according to Any EXAMPLE herein, where the sensors include one color camera of variable focal length/zoom. 72. The lightweight stabilized camera gimbal according to Any EXAMPLE herein, where a system of rotational angle feedback is provided through an angle sensor. 73. The lightweight stabilized camera gimbal according to Any EXAMPLE herein, where motion of the rotational degrees of freedom are controlled by rotational control computers. 74. The lightweight stabilized camera gimbal according to Any EXAMPLE herein, where a removable data storage (cfexpress, microsd, sd card) is provided at a payload interface wall. 75. The lightweight stabilized camera gimbal according to Any EXAMPLE herein, where the gimbal is configured to attach to an unmanned aerial system at a front of an aircraft. 76. The lightweight stabilized camera gimbal according to Any EXAMPLE herein, where the gimbal is configured with seals constructed to be impervious to penetration by water and/or small particles like sand or dust. 77. The lightweight stabilized camera gimbal according to Any EXAMPLE herein, where at least one stage of the gimbal is constructed of a bonded composite structure, includes: one or more thin-wall composite skins, constructed of bonded fabric, metal or other material; and one or more internal composing structures that hold the skins.

One EXAMPLE includes: EXAMPLE 78. A stabilized camera gimbal includes at least one computer, includes: a dedicated vision computer, a dedicated targeting computer, and one or more rotational actuator control computers, where excess heat generated by one or more of the computers are disposed of through a heat transfer surface integrated into a skin of the stabilized camera gimbal.

This application is related to U.S. Provisional Application No. 63/185,578 filed on May 7, 2021, which is hereby incorporated by reference in its entirety for all purposes as if fully set forth herein. Additionally, this application is related to U.S. Non-Provisional application Ser. No. 17/738,102 filed May 6, 2022, entitled LIGHTWEIGHT HIGH RESOLUTION CAMERA PAYLOAD FOR SMALL AERIAL VEHICLES, which is hereby incorporated by reference in its entirety for all purposes as if fully set forth herein.

The many features and advantages of the disclosure are apparent from the detailed specification, and, thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A gimbal configured to be implemented in an unmanned aerial system, the gimbal comprising:
   a payload interface comprising a payload interface wall and the payload interface being configured with mechanical retention components configured for tool-free mechanical attachment to an unmanned aerial system;
   the payload interface further configured with electrical connections configured to receive power from the unmanned aerial system;
   the payload interface further configured with electrical connections configured to exchange data with the unmanned aerial system;
   an end effector configured to hold at least one sensor in a stabilized orientation;
   a structure comprising composite skins, an internal structure, and integrated seals;
   integrated drive components with gearing and bearings arranged on outermost diameter of rotation interfaces and the integrated drive components are configured with one, two or three rotational degrees of freedom; and
   at least one computer that comprises at least one of the following: a dedicated vision computer, a dedicated targeting computer, and/or one or more rotational actuator control computers,
   wherein excess heat generated by the at least one computer is disposed of through a heat transfer surface integrated into the composite skin of the gimbal.

2. The gimbal according to claim 1, further comprising:
   a first stage configured as a "roll" stage;
   a second stage configured as a "pitch" stage; and
   a third stage configured as another "roll" stage,
   wherein the first stage, the second stage, and the third stage are configured with rotational degrees of freedom,
   wherein the mechanical retention components are configured for insertion into corresponding features of the unmanned aerial system.

3. The gimbal according to claim 2 wherein the third stage is configured to continuously rotate,
   wherein the mechanical retention components comprise arms configured to flex and end portions with hooks.

4. The gimbal according to claim 1 further comprising a heat sink thermally coupled to the at least one computer,
   wherein the excess heat generated by the at least one computer is disposed of through the heat sink and the heat transfer surface integrated into the composite skin of the gimbal.

5. The gimbal according to claim 1, wherein the sensor comprises a single color camera.

6. The gimbal according to claim 1, wherein the sensor comprises one color camera of fixed focal length and at least one thermal camera of fixed focal length.

7. The gimbal according to claim 1, wherein the sensor comprises one color camera configured with a variable focal length and/or a variable zoom.

8. The gimbal according to claim 1, further comprising a system configured to provide rotational angle feedback implemented with an angle sensor.

9. The gimbal according to claim 1, further comprising at least one rotational control computer configured to control a motion of the gimbal to have multiple rotational degrees of freedom.

10. The gimbal according to claim 1, further comprising: a removable data storage arranged in the payload interface wall.

11. The gimbal according to claim 1, wherein the payload interface is configured to be attached to the unmanned aerial system at a front of an aircraft.

12. The gimbal according to claim 1,
    wherein the integrated seals are configured to limit penetration by water and/or small particles; and
    wherein the electrical connections comprise a spring-loaded construction.

13. The gimbal according to claim 1, further comprising:
    at least one stage configured with a bonded composite structure,
    wherein the bonded composite structure comprises one or more thin-wall composite skins constructed of bonded fabric, metal or synthetic material; and
    wherein the bonded composite structure further comprises one or more internal composing structures configured to hold the one or more thin-wall composite skins.

14. A process of implementing a lightweight stabilized attachment to an unmanned aerial system, the process of implementing a lightweight stabilized attachment to an unmanned aerial system comprising:
    implementing a gimbal;
    configuring a payload interface of the gimbal comprising a payload interface wall and the payload interface being configured with mechanical retention components configured for tool-free mechanical attachment to an unmanned aerial system;

configuring the payload interface of the gimbal for electrical connections to receive power from the unmanned aerial system;

configuring the payload interface of the gimbal for electrical connections to exchange data with the unmanned aerial system;

configuring the gimbal with one, two or three rotational degrees of freedom;

configuring an end effector of the gimbal to hold at least one sensor in a stabilized orientation;

constructing the gimbal with composite skins and internal structure;

constructing the gimbal with integrated seals and bearings in an outermost diameter of rotational interfaces;

implementing integrated drive components with gearing arranged on outermost diameter of rotation interfaces; and implementing at least one computer that comprises at least one of the following: a dedicated vision computer, a dedicated targeting computer, and/or one or more rotational actuator control computers, wherein excess heat generated by the at least one computer is disposed of through a heat transfer surface integrated into the composite skin of the gimbal.

15. The process of implementing a lightweight stabilized attachment to an unmanned aerial system according to claim 14, further comprising:

implementing a first stage configured as a "roll" stage;

implementing a second stage configured as a "pitch" stage; and implementing a third stage configured as another "roll" stage, wherein the first stage, the second stage, and the third stage are configured with rotational degrees of freedom, wherein the mechanical retention components are configured for insertion into corresponding features of the unmanned aerial system.

16. The process of implementing a lightweight stabilized attachment to an unmanned aerial system according to claim 15, wherein the third stage is configured to continuously rotate, wherein the mechanical retention components comprise arms configured to flex and end portions with hooks.

17. The process according to claim 14, further comprising thermally coupling a heat sink to the at least one computer, wherein the excess heat generated by the at least one computer is disposed of through the heat sink and the heat transfer surface integrated into the composite skin of the gimbal.

18. The process of implementing a lightweight stabilized attachment to an unmanned aerial system according to claim 14, wherein the sensor comprises a single color camera; and wherein the electrical connections comprise a spring-loaded construction.

19. The process of implementing a lightweight stabilized attachment to an unmanned aerial system according to claim 14, wherein the sensor comprises one color camera of fixed focal length and one thermal camera of fixed focal length.

20. The process of implementing a lightweight stabilized attachment to an unmanned aerial system according to claim 14, wherein the sensor comprises one color camera configured with a variable focal length and/or a variable zoom.

* * * * *